(12) United States Patent
Umaya et al.

(10) Patent No.: US 11,174,843 B2
(45) Date of Patent: Nov. 16, 2021

(54) SOLAR THERMAL POWER GENERATION EQUIPMENT INCLUDING WIND TURBINE ON THE SAME VERTICALLY ORIENTED SHAFT

(71) Applicant: Mitsubishi Hitachi Power Systems, Ltd., Yokohama (JP)

(72) Inventors: Masahide Umaya, Yokohama (JP); Masato Ota, Yokohama (JP); Naoyuki Nagafuchi, Yokohama (JP); Tadaharu Kishibe, Yokohama (JP); Takahiro Marumoto, Yokohama (JP); Masato Kurita, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 16/647,706

(22) PCT Filed: Jul. 12, 2018

(86) PCT No.: PCT/JP2018/026309
§ 371 (c)(1),
(2) Date: Mar. 16, 2020

(87) PCT Pub. No.: WO2019/058716
PCT Pub. Date: Mar. 28, 2019

(65) Prior Publication Data
US 2020/0277935 A1  Sep. 3, 2020

(30) Foreign Application Priority Data

Sep. 22, 2017 (JP) .............................. JP2017-182331

(51) Int. Cl.
*F03D 9/00* (2016.01)
*F03D 9/43* (2016.01)
(Continued)

(52) U.S. Cl.
CPC ............. *F03D 9/007* (2013.01); *F01D 15/12* (2013.01); *F01K 23/02* (2013.01); *F02C 1/05* (2013.01);
(Continued)

(58) Field of Classification Search
CPC ......... F03D 9/007; Y02E 10/74; F03G 6/064; F01K 23/06–108
See application file for complete search history.

(56) References Cited

U.S. PATENT DOCUMENTS 4,382,190 A * 5/1983 Jacobson .................. F03D 9/25
290/55
2011/0233940 A1 9/2011 Aoyama et al.
(Continued)

FOREIGN PATENT DOCUMENTS

DE     3037574    7/1982
EP     2 889 480  7/2015
(Continued)

OTHER PUBLICATIONS

International Search Report dated Sep. 11, 2018 in International (PCT) Application No. PCT/JP2018/026309 with English translation.
(Continued)

*Primary Examiner* — Laert Dounis
(74) *Attorney, Agent, or Firm* — Wenderoth, Lind & Ponack, L.L.P.

(57) ABSTRACT

Solar thermal power generation equipment is equipped with a wind turbine, a compressor, a heat receiver that receives sunlight to heat a compressed medium from the compressor, a turbine driven by the compressed medium heated with the heat receiver, a power generator that performs power generation by driving of the turbine, a transmission mechanism that transmits the rotation of the wind turbine to the power
(Continued)

generator, and a tower which supports these components. The wind turbine, the compressor, the turbine, and the power generator each constitute an array apparatus. The plurality of array apparatuses are arranged in a vertical direction.

17 Claims, 8 Drawing Sheets

(51) Int. Cl.
    *F03D 15/00*     (2016.01)
    *F01K 23/02*     (2006.01)
    *F03D 3/00*     (2006.01)
    *F03G 6/00*     (2006.01)
    *F02C 1/05*     (2006.01)
    *F01D 15/12*     (2006.01)
    *F03G 6/06*     (2006.01)

(52) U.S. Cl.
    CPC .............. *F03D 3/005* (2013.01); *F03D 9/43* (2016.05); *F03D 15/00* (2016.05); *F03G 6/00* (2013.01); *F03G 6/003* (2013.01); *F03G 6/063* (2021.08); *Y02B 10/30* (2013.01); *Y02E 10/46* (2013.01); *Y02E 10/728* (2013.01); *Y02E 10/74* (2013.01); *Y02E 70/30* (2013.01)

(56) References Cited

U.S. PATENT DOCUMENTS

| | | | |
|---|---|---|---|
| 2012/0096844 A1* | 4/2012 | Caldwell | F16H 61/4035 60/327 |
| 2012/0111025 A1 | 5/2012 | Gericke et al. | |
| 2013/0147196 A1* | 6/2013 | Wieghardt | F03G 6/064 290/52 |
| 2014/0102073 A1 | 4/2014 | Pang et al. | |
| 2017/0114778 A1* | 4/2017 | Madson | F03D 13/20 |
| 2020/0182094 A1* | 6/2020 | Umaya | F03G 6/067 |

FOREIGN PATENT DOCUMENTS

| | | | |
|---|---|---|---|
| EP | 3 135 907 | | 3/2017 |
| JP | 54-155336 | | 12/1979 |
| JP | 01-116289 | | 5/1989 |
| JP | 2000-161013 | | 6/2000 |
| JP | 2004204825 A | * | 7/2004 |
| JP | 2012-047086 | | 3/2012 |
| JP | 2012-92835 | | 5/2012 |
| JP | 2012-522185 | | 9/2012 |
| JP | 2013-501891 | | 1/2013 |
| JP | 2014-80975 | | 5/2014 |
| JP | 2015-124848 | | 7/2015 |
| JP | 3201957 | | 1/2016 |
| JP | 2017-044171 | | 3/2017 |
| WO | 2010/147003 | | 12/2010 |
| WO | 2011/147996 | | 12/2011 |
| WO | 2011/148654 | | 12/2011 |
| WO | WO-2013157629 A1 * | 10/2013 | .............. H02J 3/40 |
| WO | 2014/024415 | | 2/2014 |

OTHER PUBLICATIONS

Written Opinion of the International Searching Authority dated Sep. 11, 2018 in International (PCT) Application No. PCT/JP2018/026309 with English translation.

\* cited by examiner

SOLAR THERMAL POWER GENERATION EQUIPMENT INCLUDING WIND TURBINE ON THE SAME VERTICALLY ORIENTED SHAFT

TECHNICAL FIELD

The present invention relates to solar thermal power generation equipment that performs power generation with thermal energy obtained from sunlight.

Priority is claimed on Japanese Patent Application No. 2017-182331, filed Sep. 22, 2017, the content of which is incorporated herein by reference.

BACKGROUND ART

In recent years, equipment that utilizes thermal energy obtained by condensing sunlight has been actively developed as environment-friendly clean energy.

As an example of such equipment, for example, there is solar thermal power generation equipment described in Patent Literature 1 below. This solar thermal power generation equipment is equipped with a compressor that compresses air as a working medium to generate compressed air, a heat receiver that receives sunlight to heat water, a heliostat that irradiates sunlight to the heat receiver, a wind turbine that rotates by receiving the wind, a heat generator that generates heat by rotation of the wind turbine to heat water, a turbine that is driven by steam obtained by heating of the water, and a power generator that performs power generation by driving of the turbine. In the solar thermal power generation equipment, the wind turbine, the heat generator, and the heat receiver are provided in a tower.

CITATION LIST

Patent Literature

[Patent Literature 1]
Japanese Unexamined Patent Application, First Publication No. 2012-047086

SUMMARY OF INVENTION

Technical Problem

In the solar thermal power generation equipment, for reasons such as ensuring a sufficient installation region of the heliostat, it is desired to make effective use of an installation region of the equipment, by reducing the total occupied area of a plurality of devices except the heliostat among the plurality of devices that make up the equipment.

Therefore, an object of the present invention is to provide solar thermal power generation equipment capable of effectively utilizing an installation region.

Solution to Problem

According to an aspect of the invention for achieving the aforementioned object, there is provided solar thermal power generation equipment which includes a wind turbine which is configured to rotate by receiving wind; a compressor which is configured to compress a working medium to generate a compressed medium; a heat receiver which is configured to heat the compressed medium by receiving sunlight; a turbine which is configured to be driven by the compressed medium heated with the heat receiver; a power generator which is configured to perform power generation by driving of the turbine; a transmission mechanism which transmits the rotation of the wind turbine to the power generator; and a tower which supports the wind turbine, the compressor, the heat receiver, the turbine and the power generator. The compressor has a compressor rotor which is configured to rotate about a compressor axis extending in a vertical direction, and a compressor casing which covers the compressor rotor. The turbine has a turbine rotor which is configured to rotate about a turbine axis extending in the vertical direction, and a turbine casing which covers the turbine rotor. The compressor rotor and the turbine rotor are mechanically connected to form a gas turbine rotor. The power generator has a power generator rotor which is mechanically connected to the gas turbine rotor, and is configured to rotate about a power generator axis extending in the vertical direction, and a power generator casing which covers the power generator rotor. The wind turbine, the compressor, the turbine and the power generator each constitute an array apparatus. The plurality of array apparatuses are arranged in the vertical direction.

In this aspect, the plurality of array apparatuses are disposed side by side in the vertical direction. Therefore, since the occupied areas of the plurality of array apparatuses overlap in the vertical direction in this aspect, the total occupied areas of the plurality of array apparatuses can be reduced.

Further, in the present aspect, since the wind turbine and the gas turbine share one power generator, it is possible to reduce equipment costs as compared to a case in which the power generator that performs power generation by rotation of the wind turbine and the power generator that performs power generation by driving of the gas turbine are provided separately.

Here, in the solar thermal power generation equipment, the wind turbine may have a wind turbine shaft which is configured to rotate about a wind turbine axis extending in the vertical direction, and a blade which is fixed to the wind turbine shaft and is configured to receive the wind to rotate the wind turbine shaft about the wind turbine axis.

The wind turbine of the aspect is a vertical shaft-type wind turbine. The wind turbine includes a horizontal shaft-type wind turbine in addition to the vertical shaft-type wind turbine. In the case of the horizontal shaft-type wind turbine, since there is a need to make the direction in which the wind flows substantially coincide with the direction in which the wind turbine shaft extends, the structure becomes complicated and the cost of the wind turbine increases. Further, a load from the wind is applied in the direction in which the wind turbine shaft extends, and as a result, a lateral load is applied to the upper part of the tower. For this reason, it is necessary to configure a tower that is strong against a bending moment, and the cost of the tower increases. On the other hand, in the case of the vertical shaft-type wind turbine, since there is no need to make the direction in which the wind flows coincide with the direction in which the wind turbine shaft extends, the structure is simpler than in the horizontal shaft-type wind turbine, and the cost of the wind turbine can be reduced. Further, in the vertical shaft-type wind turbine, even if the blades receive wind, the horizontal force to be applied to the vertically extending wind turbine shaft can be set to be smaller than the horizontal force to be applied to the wind turbine shaft of the horizontal shaft-type wind turbine. Therefore, in the vertical shaft-type wind turbine, the lateral load to be applied to the upper part of the tower can be set to be smaller than that in the horizontal shaft-type wind turbine, and the cost of the tower can be reduced.

In the solar thermal power generation equipment including the wind turbine having the wind turbine shaft and the blade, the wind turbine may be disposed at a position lower than the heat receiver. In this case, the wind turbine may have a wind turbine radius changing mechanism which is configured to change a wind turbine radius which is a distance from the wind turbine shaft to a farthest position in the blade.

In this aspect, by changing the wind turbine radius with the wind turbine radius changing mechanism, it is possible to adjust the amount of power generation due to rotation of the wind turbine by the wind, and the amount of power generation due to driving of the turbine by the sunlight.

The solar thermal power generation equipment having the wind turbine radius changing mechanism may include a control device which instructs the wind turbine radius changing mechanism to change the wind turbine radius, depending on an amount of solar radiation at an installation position of the tower.

According to this aspect, it is possible to adjust the amount of power generation due to rotation of the wind turbine by the wind, and the amount of power generation due to driving of the turbine by the sunlight, depending on the amount of solar radiation.

In the solar thermal power generation equipment having the control device, the control device instructs the wind turbine radius changing mechanism to change the wind turbine radius, depending on the amount of solar radiation at the installation position of the tower and a wind speed at the installation position of the tower.

According to this aspect, it is possible to adjust the amount of power generation due to rotation of the wind turbine by the wind, and the amount of power generation due to driving of the turbine by the sunlight, depending on the amount of solar radiation and the wind speed.

Any of the solar thermal power generation equipment may include a clutch between the gas turbine rotor and the power generator rotor, which is configured to switch a connection state between the gas turbine rotor and the power generator rotor, between a transmission state in which power is transmittable and a non-transmission state in which no power transmission is performed.

According to this aspect, by setting the clutch in the transmission state, the power generator can generate power by driving of the gas turbine. Further, in this aspect, by setting the clutch in the non-transmission state, the power generator can generate power by the rotation of the wind turbine, without rotating the gas turbine rotor.

In any of the solar thermal power generation equipment, the transmission mechanism may have a hydraulic pump which is configured to convert the rotation of the wind turbine into oil pressure, a hydraulic motor which has an output shaft, and is configured to receive the oil compressed by the hydraulic pump to rotate the output shaft, and a connecting hydraulic line which connects the hydraulic pump and the hydraulic motor so that the oil passes between the hydraulic pump and the hydraulic motor. In this case, the output shaft of the hydraulic motor may be mechanically connected to the power generator rotor.

In this aspect, when another device is disposed between the wind turbine and the power generator, the hydraulic pump is disposed on the wind turbine side on the basis of the other device, and the hydraulic motor is disposed on the power generator side on the basis of the other device.

Further, the connecting hydraulic line which connects the hydraulic pump and the hydraulic motor is diverted to the other device. For this reason, in this aspect, when another device is disposed between the wind turbine and the power generator, the rotation of the wind turbine can be transmitted to the power generator rotor with a simple structure.

In the solar thermal power generation equipment having the hydraulic pump and the hydraulic motor, the transmission mechanism may have a rotational speed adjusting mechanism which is configured to set a rotational speed of the output shaft to a target rotational speed.

In this aspect, even if the rotational speed of the wind turbine is unstable, the rotational speed of the output shaft can be stabilized at the target rotational speed.

Any of the solar thermal power generation equipment having the hydraulic pump and the hydraulic motor may include a clutch between the output shaft of the hydraulic motor and the power generator rotor, which is configured to switch a connection state between the output shaft and the power generator rotor, between a transmission state in which power is transmittable and a non-transmission state in which no power transmission is performed.

In this aspect, by setting the clutch in the transmission state, the power generator can generate power by the rotation of the wind turbine. Further, in this aspect, by setting the clutch in the non-transmission state, even when the wind turbine is not rotating, the power generator can generate power by driving of the gas turbine.

Any of the solar thermal power generation equipment may include an exhaust heat recovery boiler which is configured to heat water with an exhaust medium which is the working medium exhausted from the turbine and is configured to turn the water into steam.

According to this aspect, the heat of the exhaust medium exhausted from the turbine can be effectively used.

In the solar thermal power generation equipment including the exhaust heat recovery boiler, the exhaust heat recovery boiler may form an array apparatus, and the plurality of array apparatuses including the exhaust heat recovery boiler may be arranged in the vertical direction.

In this aspect, even if the exhaust heat recovery boiler is added, since the plurality of array apparatuses including the exhaust heat recovery boiler are arranged in the vertical direction, the occupied areas of the plurality of array apparatuses overlap in the vertical direction, and the total occupied area of the plurality of array apparatuses can be reduced.

The solar thermal power generation equipment including the exhaust heat recovery boiler may include a steam turbine which is configured to be driven by steam from the exhaust heat recovery boiler, a condenser which is configured to return steam, which is exhausted from the steam turbine, into water, and a water supply line which is configured to guide water in the condenser to the exhaust heat recovery boiler.

In this aspect, the steam turbine can also be driven.

In the solar thermal power generation equipment including the steam turbine, the steam turbine may have a steam turbine rotor which is configured to rotate about a steam turbine axis extending in the vertical direction, and a steam turbine casing which covers the steam turbine rotor. The steam turbine may form an array apparatus, and the plurality of array apparatuses including the steam turbine may be arranged in the vertical direction.

In this aspect, even if the steam turbine is added, since the plurality of array apparatuses including the steam turbine are arranged in the vertical direction, the occupied areas of the plurality of array apparatuses overlap in the vertical direction, and the total occupied areas of the plurality of array apparatuses can be reduced.

In the solar thermal power generation equipment in which the steam turbine forms the array apparatus, the compressor and the turbine may be disposed on one side of an upper side in the vertical direction and a lower side in the vertical direction, on the basis of the power generator, and the steam turbine may be disposed on the other side of the upper side in the vertical direction and the lower side in the vertical direction, on the basis of the power generator. In this case, the steam turbine rotor may be mechanically connected to the power generator rotor. Further, in this aspect, a clutch may be included between the steam turbine rotor and the power generator rotor, which is configured to switch a connection state between the steam turbine rotor and the power generator rotor, between a transmission state in which power is transmittable and a non-transmission state in which no power transmission is performed.

In this aspect, by setting the clutch in the transmission state, the power generator can generate power by driving of the steam turbine. Further, in this aspect, by setting the clutch in the non-transmission state, even when the steam turbine is not rotating, the power generator can generate power by driving of the gas turbine or rotation of the wind turbine.

In the solar thermal power generation equipment including the condenser, the condenser may have a water storage unit in which the water is stored after the steam exhausted from the steam turbine returns to the water. In this case, the water storage unit may form an array apparatus, and the plurality of array apparatuses including the water storage unit may be arranged in the vertical direction.

In this aspect, even if the condenser is added, since the plurality of array apparatuses including the water storage unit of the condenser are arranged in the vertical direction, the occupied areas of the plurality of array apparatuses overlap in the vertical direction, and the total occupied area of the plurality of array apparatuses can be reduced.

In any of the solar thermal power generation equipment including the exhaust heat recovery boiler, the turbine may be disposed above the compressor, and the exhaust heat recovery boiler may be disposed above the turbine.

Among the turbine, the compressor and the exhaust heat recovery boiler, the exhaust heat recovery boiler is the lightest. For this reason, in this aspect, by disposing the exhaust heat recovery boiler among these devices at the top, it is possible to suppress an increase in the strength required for a structural material constituting the tower. Further, since the exhaust medium exhausted from the turbine has a high temperature, the exhaust medium rises by natural convection. Therefore, by disposing the exhaust heat recovery boiler above the turbine, the exhaust medium can be efficiently guided to the exhaust heat recovery boiler.

Any of the solar thermal power generation equipment including the exhaust heat recovery boiler may include a heat storage body which stores heat of the exhaust medium.

In this aspect, the heat of the exhaust medium can be effectively used.

Any of the solar thermal power generation equipment including the steam turbine may include a heat storage body which stores heat of the exhaust medium; an auxiliary water supply line branching from the water supply line; a steam generator which has a heat transfer tube connected to the auxiliary water supply line and coming into contact with the heat storage body to exchange heat between the water from the auxiliary water supply line and the heat storage body, and is configured to heat the water with the heat storage body to turn water into steam; and an auxiliary steam line which is configured to guide steam generated by the steam generator to the steam turbine.

In this aspect, since the steam can be generated by the heat stored in the heat storage body, the steam can be supplied to the steam turbine even when the sun is not shining.

Any of the solar thermal power generation equipment may include a heliostat which has a reflecting mirror which reflects sunlight, and a mirror driver which is configured to change a direction of the reflecting mirror so that sunlight reflected by the reflecting mirror is directed to the heat receiver.

Advantageous Effects of Invention

According to an aspect of the present invention, since the occupied areas of the plurality of array apparatuses overlap in the vertical direction, the total occupied areas of the plurality of array apparatuses can be reduced. Therefore, according to an aspect of the present invention, it is possible to effectively use an installation region of the equipment.

DESCRIPTION OF EMBODIMENTS

Hereinafter, various embodiments of the solar thermal power generation equipment according to the present invention will be described in detail with reference to the drawings.

First Embodiment

A first embodiment of the solar thermal power generation equipment will be described with reference to FIGS. 1 to 3.

Figure 1:
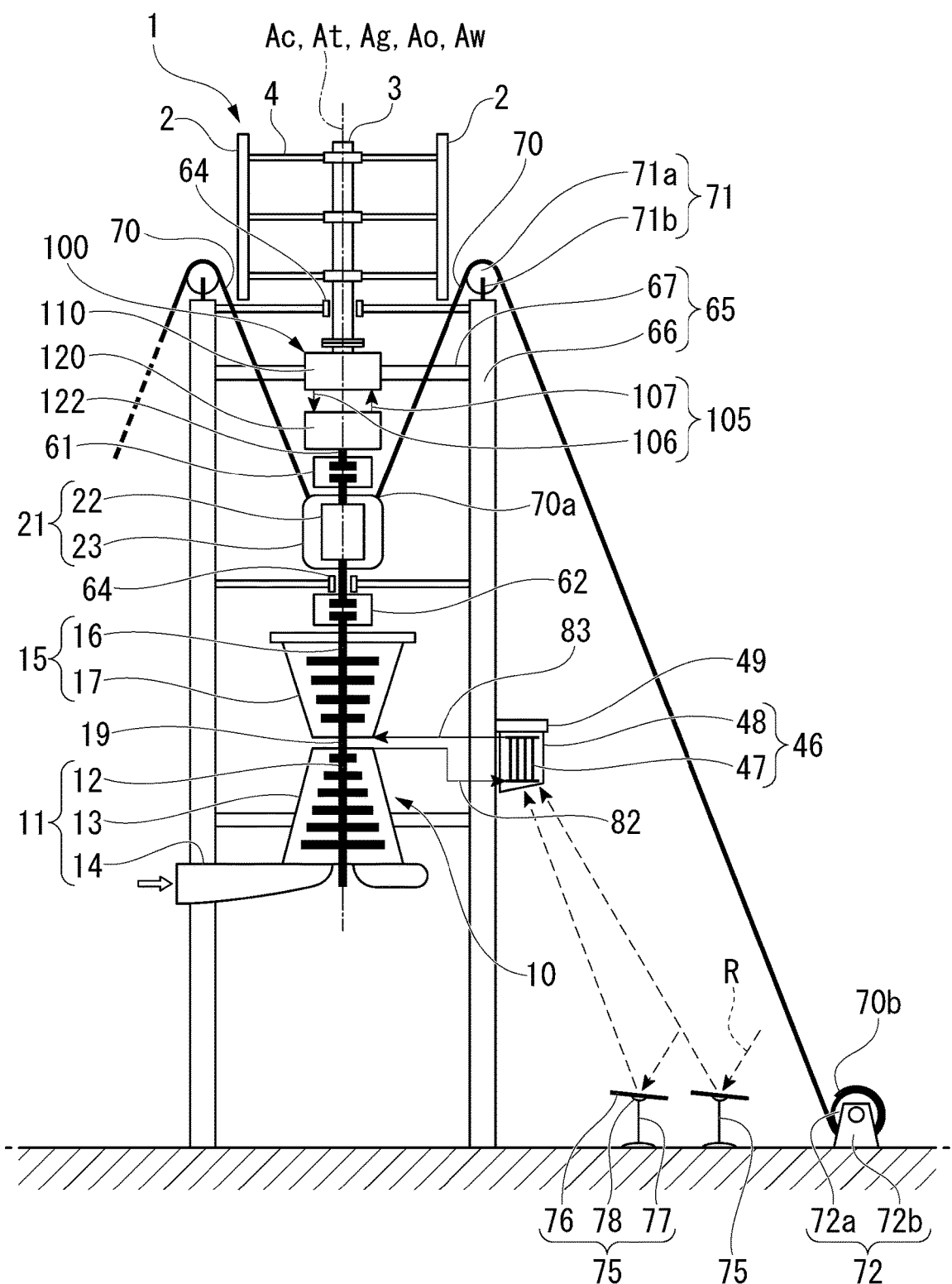
FIG. 1 is an explanatory view showing a configuration of solar thermal power generation equipment in a first embodiment according to the present invention.

As shown in FIG. 1, the solar thermal power generation equipment of the present embodiment is equipped with a wind turbine 1, a compressor 11, a heat receiver 46, a turbine 15, a power generator 21, a transmission mechanism 100, a first clutch 61, a second clutch 62, a tower 65, and a plurality of heliostats 75 that reflect sunlight R in a target direction.

The compressor 11 compresses air as a working medium to generate compressed air that is a compressed medium. The compressor 11 has a compressor rotor 12 that rotates about a compressor axis Ac extending in a vertical direction, a compressor casing 13 that covers the compressor rotor 12, and an intake casing 14 that guides outside air into the compressor casing 13.

The heat receiver 46 receives the sunlight R from the heliostat 75 to heat the compressed air. The heat receiver 46 has a heat transfer tube 47 and a heat receiver casing 48 that covers the heat transfer tube 47. A lower part of the heat receiver casing 48 is open. The heat transfer tube 47 is connected to a discharge port of the compressor 11 by a compressed air line (a compressed medium line) 82.

The turbine 15 is driven by the compressed air heated by the heat receiver 46. The turbine 15 has a turbine rotor 16 that rotates around a turbine axis At extending in the vertical direction, and a turbine casing 17 that covers the turbine rotor 16. A medium inlet of the turbine casing 17 is connected to the heat transfer tube 47 of the heat receiver 46 by a heated air line (a heating medium line) 83.

A gas turbine 10 is configured to have the compressor 11, the heat receiver 46, and the turbine 15 described above. The turbine rotor 16 and the compressor rotor 12 are mechanically directly connected, integrally rotate, and form a gas turbine rotor 19.

The power generator 21 performs power generation by driving the turbine 15 and rotating the wind turbine 1. The power generator 21 has a power generator rotor 22 that rotates about a power generator axis Ag extending in the vertical direction, and a power generator casing 23 that covers the power generator rotor 22.

At least one of the plurality of rotors 19 and 22 is supported by a radial bearing 64 that restricts the movement of the one rotor in a radial direction, while allowing the movement of the one rotor in a thrust direction (vertical direction). The radial bearing 64 is provided in the tower 65.

Figure 2:
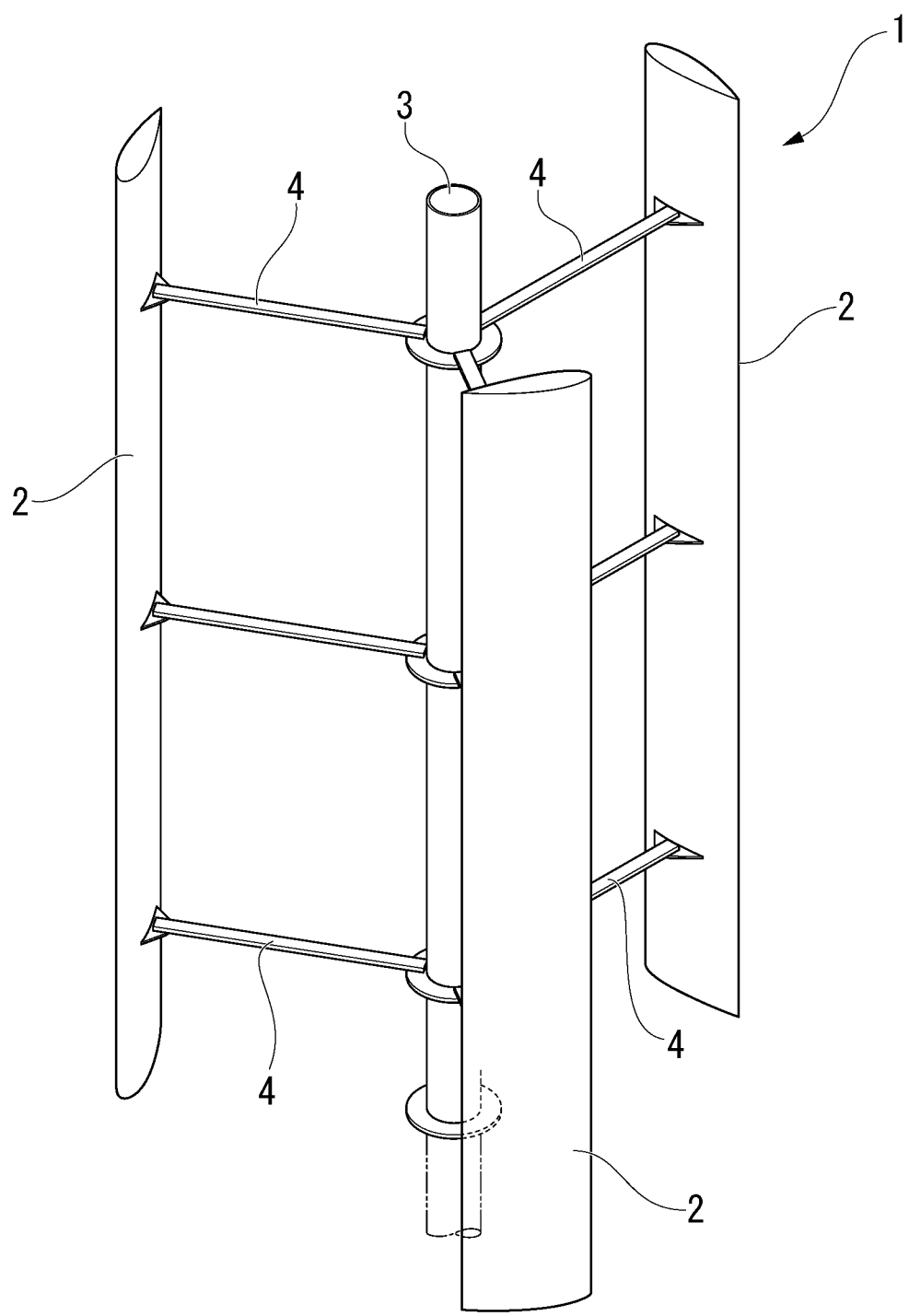
FIG. 2 is a perspective view of a wind turbine according to the first embodiment of the present invention.

As shown in FIG. 2, the wind turbine 1 is a gyromill type wind turbine, in other words, a straight blade vertical shaft-type wind turbine. The wind turbine 1 has a plurality of blades 2 and a wind turbine shaft 3 that rotates about a wind turbine axis Aw extending in the vertical direction. The wind turbine shaft 3 is long in the vertical direction. The plurality of blades 2 are straight blades that are long in the vertical direction. The plurality of blades 2 are disposed at equal intervals in a circumferential direction with respect to the wind turbine axis Aw, around the wind turbine shaft 3. The plurality of blades 2 are fixed to the wind turbine shaft 3 via a blade support arm 4.

The transmission mechanism 100 transmits the rotation of the wind turbine 1 to the power generator rotor 22. As shown in FIG. 3, the transmission mechanism 100 is a hydraulic transmission and has a hydraulic pump 110, a hydraulic motor 120, a connecting hydraulic line 105, a rotary angle sensor 102, a rotational speed sensor 103, and a controller 101.

The hydraulic pump 110 converts the rotation of the wind turbine 1 into oil pressure. The hydraulic pump 110 has a corrugated cylindrical cam 111, a plurality of reciprocating actuators 113, a branch high-pressure tube 116h and a branch low-pressure tube 116l provided for each of the plurality of reciprocating actuators 113, an annular high-pressure tube 118h which interconnects the branch high-pressure tubes 116h provided for each of the plurality of reciprocating actuators 113, an annular low-pressure tube 118l which interconnects the branch low-pressure tubes 116l provided for each of the plurality of reciprocating actuators 113, a high-pressure valve 117h provided in the branch high-pressure tubes 116h, and a low-pressure valve 117l provided in the branch low-pressure tube 116l.

The corrugated cylindrical cam 111 has a cylindrical shape centered on the wind turbine axis Aw, and an outer peripheral surface thereof forms a cam surface 111cs. The cam surface 111cs has a waveform that repeats irregularities in the circumferential direction with respect to the wind turbine axis Aw. The corrugated cylindrical cam 111 is fixed to the outer peripheral surface of the wind turbine shaft 3 at a lower end portion of the cylindrical wind turbine shaft 3.

The reciprocating actuator 113 has a piston 115 and a cylinder 114 which accommodates the piston 115 to be reciprocally movable. The piston 115 has a piston body 115a that reciprocates in the cylinder 114, and a roller 115b attached to a first end of the piston body 115a in a rotatable manner. The roller 115b and the first end of the piston body 115a protrude from the cylinder 114. A space surrounded by an inner surface of the cylinder 114 and a second end of the piston body 115a forms a hydraulic chamber 114a into which oil flows. The reciprocating actuator 113 is disposed such that a reciprocating direction of the piston 115 is in a radial direction with respect to the wind turbine axis Aw. The roller 115b comes into contact with the cam surface 111cs of the corrugated cylindrical cam 111. The plurality of reciprocating actuators 113 are disposed at equal intervals in the circumferential direction with respect to the wind turbine axis Aw.

A first end of the branch high-pressure tube 116h and a first end of the branch low-pressure tube 116l are both connected to the cylinder 114. Each of the annular high-pressure tube 118h and the annular low-pressure tube 118l is formed in a substantially annular shape around the wind turbine axis Aw. A second end of the branch high-pressure tube 116h is connected to the annular high-pressure tube 118h. A second end of the branch low-pressure tube 116l is connected to the annular low-pressure tube 118l.

The hydraulic motor 120 has a columnar output shaft 122, an eccentric cam 121 fixed to the output shaft 122, a plurality of reciprocating actuators 123, a branch high-pressure tube 126h and a branch low-pressure tube 126l provided for each of the plurality of reciprocating actuators 123, an annular high-pressure tube 128h which interconnects the branch high-pressure tubes 126h provided for each of the plurality of reciprocating actuators 123, an annular low-pressure tube 128l that interconnects the branch low-pressure tubes 126l provided for each of the plurality of reciprocating actuators 123, a high-pressure valve 127h provided in the branch high-pressure tube 126h, and a low-pressure valve 127l provided in the branch low-pressure tube 126l.

The eccentric cam 121 has a cylindrical shape. The outer peripheral surface of the cylindrical eccentric cam 121 forms a cam surface 121a. A central axis of the cylindrical eccentric cam 121 is parallel to a central axis Ao of the cylindrical output shaft 122 and is separated from the central axis Ao of the output shaft 122. The eccentric cam 121 rotates about the central axis Ao of the output shaft 122.

The reciprocating actuator 123 has a piston 125 and a cylinder 124 that accommodates the piston 125 to be reciprocally movable. A first end of the piston 125 protrudes from the cylinder 124. A space surrounded by an inner surface of the cylinder 124 and a second end of the piston 125 forms a hydraulic chamber 124a into which oil flows. The reciprocating actuator 123 is disposed such that a reciprocating direction of the piston 125 is in a radial direction with respect to the central axis of the eccentric cam 121. A first end of the piston 125 comes into contact with the cam surface 121a of the eccentric cam 121. The plurality of reciprocating actuators 123 are disposed at equal intervals in the circumferential direction with respect to the central axis of the eccentric cam 121.

The connecting hydraulic line 105 has a connecting high-pressure tube 106, a connecting low-pressure tube 107, and an accumulator 108. A first end of the connecting high-pressure tube 106 is connected to an annular high-pressure tube 118h of the hydraulic pump 110, and a second end of the connecting high-pressure tube 106 is connected to an annular high-pressure tube 128h of the hydraulic motor 120. A first end of the connecting low-pressure tube 107 is connected to an annular low-pressure tube 118l of the hydraulic pump 110, and a second end of the connecting low-pressure tube 107 is connected to an annular low-pressure tube 128l of the hydraulic motor 120. The accumulator 108 is connected to the connecting high-pressure tube 106. The accumulator 108 equalizes the pressure of the oil flowing through the connecting high-pressure tube 106.

The rotary angle sensor 102 detects the rotary angle of the wind turbine shaft 3 or the corrugated cylindrical cam 111. The rotational speed sensor 103 detects the rotational speed of the output shaft 122.

The controller 101 controls the operation of the plurality of high-pressure valves 117h and the plurality of low-pressure valves 117l in the hydraulic pump 110. When the roller 115b comes into contact with a portion of the cam surface 111cs of the corrugated cylindrical cam 111 from a wave bottom to a wave crest and a volume of the hydraulic chamber 114a decreases, the controller 101 opens the high-pressure valve 117h and closes the low-pressure valve 117l. As a result, the oil in the hydraulic chamber 114a flows out to the connecting high-pressure tube 106 via the branch high-pressure tube 116h and the annular high-pressure tube 118h. When the roller 115b comes into contact with a portion of the cam surface 111cs of the corrugated cylindrical cam 111 from the wave crest to the wave bottom and the volume of the hydraulic chamber 114a increases, the controller 101 closes the high-pressure valve 117h and opens the low-pressure valve 117l. As a result, the oil in the connecting low-pressure tube 107 flows into the hydraulic chamber 114a via the annular low-pressure tube 118l and the branch low-pressure tube 116l. The controller 101 recognizes which portion of the cam surface 111cs of the corrugated cylindrical cam 111, the rollers 115b of each reciprocating actuator 113 are in contact with, on the basis of the rotary angle of the wind turbine shaft 3 or the corrugated cylindrical cam 111 detected by the rotary angle sensor 102, and operates the high-pressure valve 117h and the low-pressure valve 117l of each reciprocating actuator 113 as described above.

The controller 101 controls the operation of the plurality of high-pressure valves 127h and the plurality of low-pressure valves 127l in the hydraulic motor 120. When the piston 125 presses the eccentric cam 121 to apply a rotational force to the output shaft 122, the controller 101 opens the high-pressure valve 127h and closes the low-pressure valve 127l. As a result, oil from the connecting high-pressure tube 106 flows into the hydraulic chamber 124a via the annular high-pressure tube 128h and the branch high-pressure tube 126h, and the piston 125 presses the eccentric cam 121. When the piston 125 is pressed by the eccentric cam 121, the controller 101 closes the high-pressure valve 127h and opens the low-pressure valve 127l. As a result, the oil in the hydraulic chamber 124a flows out to the connecting low-pressure tube 107 via the branch low-pressure tube 126l and the annular low-pressure tube 128l. The controller 101 operates the high-pressure valve 127h and the low-pressure valve 127l of each reciprocating actuator 123 as described above so that the rotational speed of the output shaft 122 detected by the rotational speed sensor 103 becomes a target rotational speed. Therefore, in the present embodiment, a rotational speed adjusting mechanism can be formed by the plurality of high-pressure valves 127h and low-pressure valves 127l in the hydraulic motor 120, the rotational speed sensor 103, and the controller 101 for controlling the operation of the plurality of high-pressure valves 127h and low-pressure valves 127l on the basis of the rotational speed of the output shaft 122 detected by the rotational speed sensor 103.

The transmission mechanism 100 described above, that is, the hydraulic transmission, is a known technique, and is described in detail in, for example, Japanese Translation of PCT International Application Publication No. 2012-522185 or the like.

The first clutch 61 is disposed between the output shaft 122 of the hydraulic motor 120 and the power generator rotor 22, and mechanically connects the output shaft 122 and the power generator rotor 22. The first clutch 61 switches a connection state between the output shaft 122 and the power generator rotor 22 between a transmission state in which power can be transmitted between the output shaft 122 and the power generator rotor 22 and a non-transmission state in which power transmission is not performed between the output shaft 122 and the power generator rotor 22.

The second clutch 62 is disposed between the gas turbine rotor 19 and the power generator rotor 22, and mechanically connects the gas turbine rotor 19 and the power generator rotor 22. The second clutch 62 switches the connection state between the gas turbine rotor 19 and the power generator rotor 22 between a transmission state in which power can be transmitted between the gas turbine rotor 19 and the power generator rotor 22 and a non-transmission state in which power transmission is not performed between the gas turbine rotor 19 and the power generator rotor 22.

The heliostat 75 has a reflecting mirror 76 that reflects the sunlight R, a support leg 77 that supports the reflecting mirror 76, and a mirror driver 78 that directs the reflecting mirror 76 in a target direction. The plurality of heliostats 75 are installed around the tower 65.

The tower 65 supports the wind turbine 1, the hydraulic pump 110 and the hydraulic motor 120 of the transmission mechanism 100, the first clutch 61, the power generator 21, the second clutch 62, the turbine 15, the heat receiver 46, and the compressor 11. The tower 65 has a plurality of columns 66 extending in the vertical direction, and beams 67 which interconnect the plurality of columns 66. The columns 66 and the beams 67 are formed of, for example, a steel material.

In the present embodiment, each of the wind turbine 1, the hydraulic pump 110 and the hydraulic motor 120 of the transmission mechanism 100, the first clutch 61, the power generator 21, the second clutch 62, the turbine 15, and the compressor 11 constitute an array apparatus. The plurality of array apparatuses are arranged in the vertical direction. Specifically, in the present embodiment, the wind turbine 1, the hydraulic pump 110, the hydraulic motor 120, the first clutch 61, the power generator 21, the second clutch 62, the turbine 15, and the compressor 11 are arranged in this order from top to bottom. All of the plurality of array apparatuses are disposed in a region surrounded by a plurality of columns 66 that constitute the tower 65. That is, the array apparatuses are apparatuses arranged in the tower 65 in the vertical direction. In addition, some of the array apparatuses may protrude from the tower 65.

The solar thermal power generation equipment of the present embodiment is further equipped with a plurality of suspension wires 70, a plurality of wire support machines 71, and a plurality of winding machines 72. The suspension wires 70 have a first end 70*a* and a second end 70*b*. The first end 70*a* of the suspension wires 70 is connected to the power generator casing 23. The wire support machines 71 have a support roller 71*a* and a roller support machine 71*b* that supports the support roller 71*a* in a rotatable manner. The roller support machine 71*b* is provided on the top of the column 66. The winding machines 72 have a winding drum 72*a*, and a drum support machine 72*b* that keeps the winding drum 72*a* rotatable. The second end 70*b* of the suspension wires 70 is connected to the winding drum 72*a*. The support roller 71*a* supports between the first end 70*a* and the second end 70*b* of the suspension wire 70. The second end 70*b* side of the suspension wires 70 is wound around the winding drum 72*a*. By changing a winding amount of the suspension wire 70 with respect to the winding drum 72*a*, the distance from the wire support machine 71 to the first end 70*a* of the suspension wire 70 can be changed. That is, in the present embodiment, a position of the power generator casing 23 in the vertical direction can be changed by changing the winding amount of the suspension wire 70.

The first clutch 61 and the second clutch 62 are mechanically connected to the power generator rotor 22. The hydraulic motor 120 of the transmission mechanism 100 is mechanically connected to the first clutch 61. The turbine rotor 16 is connected to the second clutch 62. The compressor rotor 12 is mechanically connected to the turbine rotor 16. For this reason, the hydraulic motor 120 of the transmission mechanism 100, the first clutch 61, the power generator 21, the second clutch 62, the turbine 15, and the compressor 11 are suspended from the wire support machine 71 by the suspension wires 70. Accordingly, the hydraulic motor 120 of the transmission mechanism 100, the first clutch 61, the power generator 21, the second clutch 62, the turbine 15, and the compressor 11 are supported by the tower 65 via the suspension wire 70 and the wire support machine 71.

The hydraulic pump 110 of the transmission mechanism 100 is fixed to the beam 67 of the tower 65. Therefore, the hydraulic pump 110 and the wind turbine 1 mechanically connected to the hydraulic pump 110 are supported by the tower 65. The wind turbine shaft 3 of the wind turbine 1 is rotatably supported by the radial bearing 64.

The heat receiver 46 is disposed in a range from a region in which the compressor 11 is disposed to a region in which the turbine 15 is disposed in the vertical direction. The heat receiver casing 48 of the heat receiver 46 is suspended from a bracket 49 fixed to the tower 65.

Next, the operation of the solar thermal power generation equipment described above will be described.

The compressor 11 suctions air (working medium) and compresses the air to generate compressed air (a compressed medium). The compressed air flows into the heat transfer tube 47 of the heat receiver 46 via the compressed air line 82. The mirror driver 78 of any one heliostat 75 of the plurality of heliostats 75 adjusts the direction of the reflecting mirror 76 so that the sunlight R reflected by the reflecting mirror 76 is directed to the heat receiver 46. As a result, the sunlight R reflected by the reflecting mirror 76 of the heliostat 75 is irradiated to the heat transfer tube 47 of the heat receiver 46 via an opening in the heat receiver casing 48 of the heat receiver 46. The compressed air flowing in the heat transfer tube 47 is heated by heat of the sunlight R received by the heat transfer tube 47.

The compressed air heated by the heat receiver 46 flows into the turbine casing 17 via the heated air line 83. The turbine rotor 16 is rotated by the compressed air. Since the compressor rotor 12 is directly connected to the turbine rotor 16, the compressor rotor 12 rotates integrally with the rotation of the turbine rotor 16.

While the turbine rotor 16 rotates, the second clutch 62 is in the transmission state. Therefore, the power generator rotor 22 rotates with the rotation of the turbine rotor 16. As a result, the power generator 21 performs power generation.

When the blades 2 of the wind turbine 1 receive the wind and the wind turbine shaft 3 rotates about the wind turbine axis Aw, the oil in the plurality of hydraulic chambers 114*a* of the hydraulic pump 110 is sequentially pressurized with the rotation of the wind turbine shaft 3. The oil flows into the hydraulic chambers 124*a* of some reciprocating actuators 123 among the plurality of reciprocating actuators 123 of the hydraulic motor 120 from the hydraulic chamber 114*a* via the branch high-pressure tube 116*h* and the annular high-pressure tube 118*h* of the hydraulic pump 110, the connecting high-pressure tube 106, and the annular high-pressure tube 128*h* and the branch high-pressure tube 126*h* of the hydraulic motor 120. When oil flows into the hydraulic chambers 124*a* of some reciprocating actuators 123, the pistons 125 of some reciprocating actuators 123 press the eccentric cams 121. As a result, a rotational force is applied to the output shaft 122, and the output shaft 122 rotates. On the other hand, the pistons 125 of some other reciprocating actuators 123 among the plurality of reciprocating actuators 123 of the hydraulic motor 120 are pressed by the eccentric cam 121. For this reason, oil returns from the hydraulic chambers 124*a* of some other reciprocating actuators 123 into some hydraulic chambers 114*a* of the hydraulic pump 110 via the branch low-pressure tube 126*l*, the annular low-pressure tube 128*l*, and the connecting low-pressure tube 107.

When the wind speed detected by an anemometer (not shown) is within a predetermined range, the first clutch 61 is in the transmission state. Therefore, the power generator rotor 22 rotates with the rotation of the wind turbine 1. As a result, the power generator 21 performs power generation. As described above, since the controller 101 controls the operation of the high-pressure valve 127*h* and the low-pressure valve 127*l* for each of the plurality of reciprocating actuators 123 in the hydraulic motor 120, the rotational speed of the output shaft 122 can be set to a desired value. For example, when a rated rotational speed (for example, 3600 rpm) is defined in the power generator 21, the controller 101 sets the rotational speed of the output shaft 122 to the rated rotational speed of the power generator 21.

When the turbine rotor 16 rotates and the second clutch 62 is in the transmission state, if the wind speed detected by the anemometer is within a predetermined range and the first clutch 61 is in the transmission state, the power generator 21 performs power generation by driving of the gas turbine 10 and rotation of the wind turbine 1.

Further, when the turbine rotor 16 rotates and the second clutch 62 is in the transmission state, if the wind speed detected by the anemometer is out of the predetermined range and the first clutch 61 is in the non-transmission state, the power generator 21 performs power generation only by driving of the gas turbine 10.

A period during which power generation is performed by driving of the gas turbine 10 is only a period during which the sun is shining. In other words, the power generation is not performed by driving of the gas turbine 10 during the period when the sun is not shining. When the gas turbine 10 is not driven, that is, when the turbine rotor 16 does not rotate, the second clutch 62 is in a non-transmission state. At this time, if the wind speed detected by the anemometer is within the predetermined range and the first clutch 61 is in the transmission state, the power generator 21 performs power generation only by the rotation of the wind turbine 1.

As described above, in the present embodiment, it is possible to generate power only by driving of the gas turbine 10, only by rotation of the wind turbine 1, or by driving of the gas turbine 10 and rotation of the wind turbine 1. Therefore, in the present embodiment, even when the weather at the power generation equipment changes suddenly or when the request for the amount of power generation from the outside greatly changes, it is possible to respond to the request for the amount of power generation from the outside.

In the present embodiment, a plurality of array apparatuses constituting the solar thermal power generation equipment are disposed in the vertical direction within a region surrounded by a plurality of columns 66 constituting the tower 65. Therefore, since the occupied areas of the plurality of array apparatuses overlap in the vertical direction, the total occupied areas of the plurality of array apparatuses can be reduced. Therefore, in the present embodiment, it is possible to effectively use the installation region of the equipment.

Further, in the present embodiment, since the wind turbine 1 and the gas turbine 10 share one power generator 21, it is possible to reduce equipment costs as compared to a case in which the power generator that performs power generation by rotation of the wind turbine 1 and the power generator 21 that performs power generation by driving of the gas turbine 10 are provided separately.

In the present embodiment, the heat receiver 46 is disposed in a range from the region in which the compressor 11 is disposed to the region in which the turbine 15 is disposed in the vertical direction. For this reason, in this embodiment, it is possible to shorten the length of the heated air line 83 for connecting the heat receiver 46 and the turbine 15, and the heat release from the heated air line 83 can be suppressed.

Further, in the present embodiment, the hydraulic motor 120 of the transmission mechanism 100, the first clutch 61, the power generator 21, the second clutch 62, the turbine 15, and the compressor 11 are suspended from the wire support machine 71 by the suspension wire 70. For this reason, when inspecting or repairing these devices, by gradually reducing the winding amount of the suspension wire 70 wound around the winding drum 72a, lowering each device downward, and sequentially detaching the devices, each device can be relatively easily inspected or repaired.

Second Embodiment

A second embodiment of the solar thermal power generation equipment will be described with reference to FIG. 4.

Figure 4:
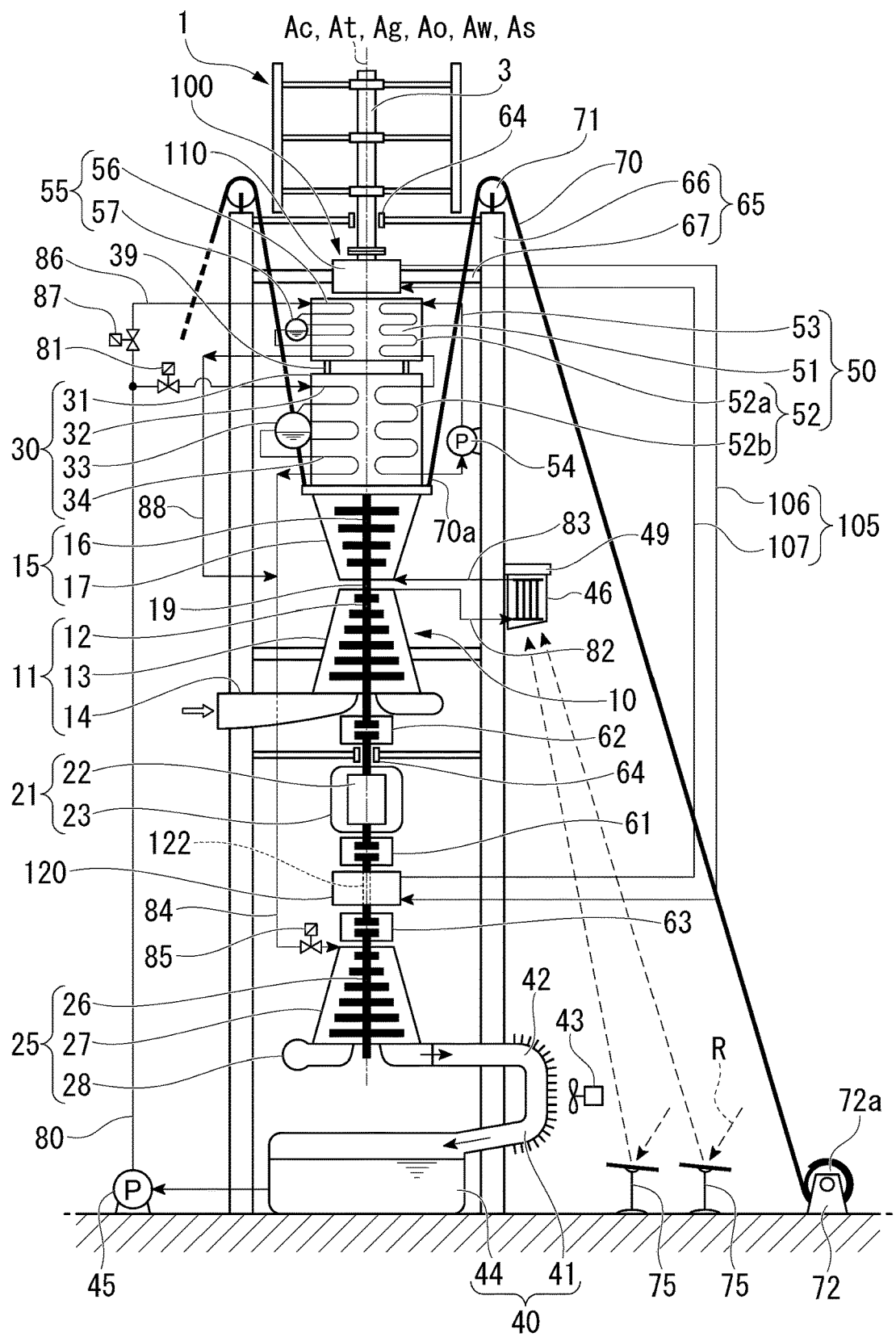
FIG. 4 is an explanatory view showing a configuration of solar thermal power generation equipment in a second embodiment according to the present invention.

As shown in FIG. 4, as in the solar thermal power generation equipment of the first embodiment, the solar thermal power generation equipment of the present embodiment is equipped with a wind turbine 1, a compressor 11, a heat receiver 46, a turbine 15, a power generator 21, a transmission mechanism 100, a first clutch 61, a second clutch 62, a tower 65, and a plurality of heliostats 75 that reflect sunlight R in a target direction. The solar thermal power generation equipment of the present embodiment is further equipped with a exhaust heat recovery boiler 30, a steam turbine 25, a condenser 40, a water supply pump 45, a heat storage device 50, a steam generator 55, and a third clutch 63.

The exhaust heat recovery boiler 30 heats water with exhaust air (exhaust medium), which is a high-temperature working medium exhausted from the turbine 15, and converts the water into steam. The exhaust heat recovery boiler 30 has a boiler casing 31 through which exhaust air from the turbine 15 flows, an economizer 32 and a superheater 34 disposed in the boiler casing 31, and an evaporator 33 partially disposed in the boiler casing 31.

The steam turbine 25 is driven by steam from the exhaust heat recovery boiler 30. The steam turbine 25 has a steam turbine rotor 26 that rotates about a steam turbine axis As extending in the vertical direction, a steam turbine casing 27 that covers the steam turbine rotor 26, and an exhaust casing 28 which guides steam from the steam turbine casing 27 to the condenser 40. The superheater 34 of the exhaust heat recovery boiler 30 and a steam inlet of the steam turbine casing 27 are connected by a main steam line 84. The main steam line 84 is provided with a main steam control valve 85.

The condenser 40 returns the steam exhausted from the steam turbine 25 to water. The condenser 40 is an air-cooled condenser. The condenser 40 has a heat radiating unit 41 and a water storage unit 44. The heat radiating unit 41 has a finned heat transfer tube 42 and a fan 43. The finned heat transfer tube 42 is connected to the exhaust casing 28 of the steam turbine 25.

The water storage unit 44 of the condenser 40 and the economizer 32 of the exhaust heat recovery boiler 30 are connected by a water supply line 80. A water supply pump 45 is provided in the water supply line 80.

The heat storage device 50 has a heat storage body 51, a medium heat transfer tube 52 in which a heat transfer medium flows, and a heat storage casing 53 that covers part of the heat storage body 51 and the medium heat transfer tube 52. Part of the medium heat transfer tube 52 forms a heat storage body heat exchange unit 52a. Another part of the medium heat transfer tube 52 is disposed inside the boiler casing 31. Another part of the medium heat transfer tube 52 forms an exhaust air heat exchange unit 52b. The medium heat transfer tube 52 is provided with a medium circulation pump 54. The heat transfer medium in the medium heat transfer tube 52 circulates in the medium heat transfer tube 52 when the medium circulation pump 54 is driven. In the exhaust air heat exchange unit 52b of the medium heat transfer tube 52, the high-temperature exhaust air flowing in the boiler casing 31 and the heat transfer medium in the exhaust air heat exchange unit 52b exchange heat, and the heat transfer medium is heated. In the heat storage body heat exchange unit 52a of the medium heat transfer tube 52, the heat storage body 51 in the heat storage casing 53 and the heat transfer medium in the heat storage body heat exchange unit 52a exchange heat, and the heat storage body 51 is heated.

The heat storage body 51 of the present embodiment is, for example, a molten salt made up of a mixture of sodium nitrate, sodium nitrite, and potassium nitrate. A melting point of the molten salt is about 130 to 170° C. Therefore, the heat storage body 51 of the present embodiment exhibits fluidity when heated by heat exchange with the heat transfer medium heated by the exhaust air. The heat storage body 51 is not limited to the molten salt. Further, here, although the heat transfer medium is circulated between the inside of the heat storage casing 53 and the inside of the boiler casing 31, as long as the heat storage body 51 has fluidity, the heat storage body 51 may be circulated between the inside of the heat storage casing 53 and the inside of the boiler casing 31.

The steam generator 55 has a heat storage body heat transfer tube 56 through which water or steam flows, and a steam drum 57 for separating steam and water as liquid. Part of the heat storage body heat transfer tube 56 is disposed inside the heat storage casing 53. For this reason, water or steam flowing inside the heat storage body heat transfer tube 56 exchanges heat with the heat storage body 51 in the heat storage casing 53 and is heated. The water is heated by the heat storage body 51 and turns into steam. The steam is further heated by the heat storage body 51 and turns into superheated steam. An auxiliary water supply line 86 branching from the water supply line 80 is connected to a first end of the heat storage body heat transfer tube 56. A first end of an auxiliary steam line 88 is connected to a second end of the heat storage body heat transfer tube 56. The second end of the auxiliary steam line 88 is connected to the main steam line 84. The auxiliary water supply line 86 is provided with an auxiliary water supply control valve 87. A water supply control valve 81 is provided on a side of the water supply line 80 closer to the exhaust heat recovery boiler 30 (a downstream side of the flow of the water supply) than a branch position of the auxiliary water supply line 86.

Further, the steam generator 55 may be configured to have a heat storage body heat transfer tube in which the heat storage body 51 from the heat storage casing 53 flows, and a steam generation casing which retains water and covers the heat storage body heat transfer tube.

In the present embodiment, the wind turbine 1, the hydraulic pump 110 of the transmission mechanism 100, the heat storage device 50, the exhaust heat recovery boiler 30, the turbine 15, the compressor 11, the second clutch 62, the power generator 21, the first clutch 61, the hydraulic pump 110 of the transmission mechanism 100, the third clutch 63, the steam turbine 25, and the water storage unit 44 of the condenser 40 constitute an array apparatus, respectively. The plurality of array apparatuses are arranged in the vertical direction. Specifically, in the present embodiment, from top to bottom, the wind turbine 1, the hydraulic pump 110 of the transmission mechanism 100, the heat storage device 50, the exhaust heat recovery boiler 30, the turbine 15, the compressor 11, the second clutch 62, the power generator 21, the first clutch 61, the hydraulic pump 110 of the transmission mechanism 100, the third clutch 63, the steam turbine 25, and the water storage unit 44 of the condenser 40 are arranged in this order. All of the plurality of array apparatuses are disposed in a region surrounded by a plurality of columns 66 constituting the tower 65. In addition, some of these array apparatuses may protrude from the tower 65.

The first clutch 61 is disposed between the output shaft 122 of the hydraulic motor 120 and the power generator rotor 22, and mechanically connects the output shaft 122 and the power generator rotor 22. The first end of the output shaft 122 is connected to the first clutch 61. The first clutch 61 switches a connection state between the output shaft 122 and the power generator rotor 22, into a transmission state in which power can be transmitted between the output shaft 122 and the power generator rotor 22, and a non-transmission state in which the power transmission is not performed between the output shaft 122 and the power generator rotor 22.

The second clutch 62 is disposed between the gas turbine rotor 19 and the power generator rotor 22, and mechanically connects the gas turbine rotor 19 and the power generator rotor 22. The second clutch 62 switches the connection state between the gas turbine rotor 19 and the power generator rotor 22, into the transmission state in which power can be transmitted between the gas turbine rotor 19 and the power generator rotor 22, and a non-transmission state in which the power transmission is not performed between the gas turbine rotor 19 and the power generator rotor 22. In the present embodiment, unlike the first embodiment, since the power generator 21 is disposed below the gas turbine 10, a positional relationship between the first clutch 61 and the second clutch 62 in the vertical direction is opposite to that of the first embodiment.

The third clutch 63 is disposed between the output shaft 122 of the hydraulic motor 120 and the steam turbine rotor 26, and mechanically connects the output shaft 122 and the steam turbine rotor 26. A second end of the output shaft 122 is connected to the third clutch 63. The third clutch 63 switches the connection state between the output shaft 122 and the steam turbine rotor 26, into the transmission state in which power can be transmitted between the output shaft 122 and the steam turbine rotor 26, and the non-transmission state in which the power transmission is not performed between the output shaft 122 and the steam turbine rotor 26. Further, a first end of the output shaft 122 of the hydraulic motor 120 is connected to the first clutch 61.

The solar thermal power generation equipment of this embodiment is also equipped with a plurality of suspension wires 70, a plurality of wire support machines 71, and a plurality of winding machines 72, similarly to the solar thermal power generation equipment of the first embodiment. In the present embodiment, a first end 70a of the suspension wire 70 is connected to the power generator casing 23.

The exhaust port of the turbine 15 opens upward. The exhaust heat recovery boiler 30 is mechanically connected to the turbine casing 17 of the turbine 15. The heat storage device 50 is disposed above the exhaust heat recovery boiler 30 and is supported by the exhaust heat recovery boiler 30 via legs 39. Further, the compressor rotor 12, the second clutch 62, the power generator rotor 22, the first clutch 61, the hydraulic motor 120, the third clutch 63, and the steam turbine rotor 26 are mechanically connected to the turbine rotor 16. Therefore, the heat storage device 50, the exhaust heat recovery boiler 30, the turbine 15, the compressor 11, the second clutch 62, the power generator 21, the first clutch 61, the hydraulic motor 120, the third clutch 63, and the steam turbine 25 are suspended from the wire support machine 71 by the suspension wire 70. Therefore, the heat storage device 50, the exhaust heat recovery boiler 30, the turbine 15, the compressor 11, the first clutch 61, the power generator 21, the second clutch 62, the hydraulic motor 120, the third clutch 63, and the steam turbine 25 are supported by the tower 65 via the suspension wire 70 and the wire support machine 71. The hydraulic pump 110 is fixed to the beam 67 of the tower 65, similarly to the solar thermal power generation equipment of the first embodiment. For this reason, the hydraulic pump 110 and the wind turbine 1 connected to the hydraulic pump 110 are supported by the tower 65. The condenser 40 and the water supply pump 45 are installed on the installation surface of the tower 65. The medium circulation pump 54 is fixed to a column 66 of the tower 65 or the like. The heat receiver 46 is attached to a bracket 49 fixed to the tower 65, as in the first embodiment.

Next, the operation of the solar thermal power generation equipment of the present embodiment described above will be described.

Similarly to the compressor 11 of the first embodiment, the compressor 11 of the present embodiment also suctions air (a working medium) and compresses the air to generate a compressed air (a compressed medium). The compressed air flows into the heat transfer tube 47 of the heat receiver 46 via the compressed air line 82, and is heated by the heat of the sunlight R from the heliostat 75.

The compressed air heated by the heat receiver 46 flows into the turbine casing 17 via the heated air line 83. The turbine rotor 16 is rotated by the compressed air. Since the compressor rotor 12 is directly connected to the turbine rotor 16, the compressor rotor 12 rotates integrally with the turbine rotor 16.

Also in the present embodiment, the second clutch 62 is in the transmission state while the turbine rotor 16 is rotating, as in the first embodiment. Therefore, the power generator rotor 22 rotates with the rotation of the turbine rotor 16. As a result, the power generator 21 performs power generation. As in the first embodiment, the second clutch 62 is in a non-transmission state while the turbine rotor 16 is not rotating.

The high-temperature air exhausted from the turbine casing 17 flows into the boiler casing 31 as an exhaust air. Further, water is supplied from the water supply line 80 to the economizer 32 of the exhaust heat recovery boiler 30. In the economizer 32, the exhaust air and water exchange heat, and the water is heated. The water heated by the economizer 32 flows into the evaporator 33 of the exhaust heat recovery boiler 30. In the evaporator 33, the water from the economizer 32 and the exhaust air exchange heat, and the water is heated and turns into steam. The steam flows into the superheater 34 of the exhaust heat recovery boiler 30. In the superheater 34, the steam and the exhaust air exchange heat, and the steam is superheated.

The steam from the exhaust heat recovery boiler 30 flows into the steam turbine casing 27 via the main steam line 84. The steam turbine rotor 26 is rotated by the steam. The steam exhausted from the steam turbine 25 flows into the finned heat transfer tube 42 of the condenser 40. The fan 43 sends cooling air to the finned heat transfer tube 42 from outside to the finned heat transfer tube 42. The steam from the steam turbine 25 exchanges heat with cooling air, is cooled and turns into water, in the process of flowing through the finned heat transfer tube 42. The water is stored in the water storage unit 44. The water stored in the water storage unit 44 is pressurized by the water supply pump 45 and sent to the economizer 32 of the exhaust heat recovery boiler 30 via the water supply line 80.

The high-temperature exhaust air flowing through the boiler casing 31 exchanges heat with the heat transfer medium in the exhaust air heat exchange unit 52*b* of the heat storage device 50, and heats the heat transfer medium. In the heat storage body heat exchange unit 52*a* of the heat storage device 50, the heat storage body 51 in the heat storage casing 53 and the heat transfer medium in the heat storage body heat exchange unit 52*a* exchange heat, and the heat storage body 51 is heated. Therefore, when the exhaust air starts to flow into the boiler casing 31, the heat of the exhaust air is stored in the heat storage body 51.

A certain period of time is required from when the turbine rotor 16 starts to rotate and high-temperature exhaust air starts to flow through the boiler casing 31 to when the steam of a flow rate necessary for driving of the steam turbine 25 is generated. Therefore, at the time of startup of the gas turbine 10, the third clutch 63 is in a non-transmission state, and the power transmission is not performed between the steam turbine rotor 26 and the power generator rotor 22. When the steam of a flow rate necessary for driving of the steam turbine 25 starts to be generated in the exhaust heat recovery boiler 30, the main steam control valve 85 opens, and the steam from the exhaust heat recovery boiler 30 flows into the steam turbine casing 27. The steam turbine rotor 26 starts rotating by the steam. Further, when the steam of a flow rate required for driving of the steam turbine 25 starts to be generated in the exhaust heat recovery boiler 30, the third clutch 63 is in the transmission state. At this time, the first clutch 61 changes to the transmission state when in the non-transmission state, and maintains the transmission state when in the transmission state. Therefore, the rotation of the steam turbine rotor 26 is transmitted to the power generator rotor 22 via the third clutch 63 and the first clutch 61. As a result, the power generator 21 performs power generation by driving of the gas turbine 10 and driving of the steam turbine 25.

After the power generation is continuously performed by the driving of the gas turbine 10 and the driving of the steam turbine 25, when the sun does not shine, the second clutch 62 enters a non-transmission state, and the power generator rotor 22 enters a state capable of rotating, regardless of the rotation and the stop of the gas turbine rotor 19. When the sun does not shine, the water supply control valve 81 further enters a fully closed state, and the auxiliary water supply control valve 87 enters a fully opened state. As a result, the water in the condenser 40 flows into the steam generator 55. The water is heated by heat exchange with the heat storage body 51 which is thermally stored to a high temperature and turns into steam. The steam is supplied into the steam turbine casing 27 via the auxiliary steam line 88. The steam turbine rotor 26 is rotated by the steam. As a result, the power generator 21 performs power generation by driving of the steam turbine 25 even when the gas turbine 10 is not driven. At this time, as described above, since the second clutch 62 is in the non-transmission state, it is not necessary to rotate the gas turbine rotor 19 by the rotation of the steam turbine rotor 26, and it is possible to enhance the power generation efficiency provided by the steam turbine 25.

Due to the heat exchange between the heat storage body 51 and the water in the steam generator 55, the amount of heat stored in the heat storage body 51 gradually decreases. For this reason, when a predetermined time elapses after the start of the supply of steam from the steam generator 55 to the steam turbine 25, it is not possible to send steam sufficient for driving of the steam turbine 25 from the steam generator 55 to the steam turbine 25. Therefore, when steam sufficient for driving of the steam turbine 25 cannot be sent from both the exhaust heat recovery boiler 30 and the steam generator 55 to the steam turbine 25, the main steam control valve 85 is closed, and the driving of the steam turbine 25 is stopped.

The first clutch 61 is in the transmission state to transmit the rotation of the steam turbine rotor 26 to the power generator rotor 22, while the steam of the flow rate required for driving of the steam turbine 25 flows into the steam turbine casing 27. Further, similarly to the first embodiment, the first clutch 61 is in the transmission state even while the wind speed detected by the anemometer is within a predetermined range. Therefore, while the wind speed detected by the anemometer is within the predetermined range, the power generator rotor 22 rotates by the rotation of the wind turbine 1.

When the sun does not shine and the turbine rotor 16 does not rotate, and when the steam of a flow rate required for driving of the steam turbine 25 does not flow into the steam turbine casing 27, if the wind speed detected by the anemometer is within a predetermined range, the second clutch 62 and the third clutch 63 are in the non-transmission state, and only the first clutch 61 is in the transmission state.

Therefore, at this time, the power generator 21 performs power generation only by the rotation of the wind turbine 1.

When the turbine rotor 16 rotates and the steam of a flow rate required for driving of the steam turbine 25 does not flow into the steam turbine casing 27, if the wind speed detected by the anemometer is within a predetermined range, the third clutch 63 is in the non-transmission state, and the first clutch 61 and the second clutch 62 are in the transmission state. Therefore, at this time, the power generator 21 performs power generation by the rotation of the turbine rotor 16 and the rotation of the wind turbine 1.

When the turbine rotor 16 and the steam turbine rotor 26 rotate, if the wind speed detected by the anemometer is within a predetermined range, the first clutch 61, the second clutch 62, and the third clutch 63 are in the transmission state. Therefore, at this time, the power generator 21 performs power generation by the rotation of the turbine rotor 16, the steam turbine rotor 26, and the wind turbine 1.

When the steam turbine rotor 26 rotates, the first clutch 61 and the third clutch 63 are in the transmission state, regardless of whether the wind speed detected by the anemometer is within a predetermined range. At this time, if the wind speed detected by the anemometer is within a predetermined range, the rotational force of the wind turbine 1 is transmitted to the output shaft 122 of the hydraulic motor 120. That is, at this time, the rotational force of the steam turbine 25 and the rotational force of the wind turbine 1 are transmitted to the output shaft 122 of the hydraulic motor 120, and the power generator 21 performs power generation by the rotation of the steam turbine rotor 26 and the wind turbine 1. At this time, if the wind speed detected by the anemometer is out of the predetermined range, all the high-pressure valves 117h and the low-pressure valves 117l of the hydraulic pump 110 and all the high-pressure valves 127h and the low-pressure valves 127l of the hydraulic motor 120 enter the open state, under the control of the controller 101. For this reason, the output shaft 122 of the hydraulic motor 120 can rotate freely with little resistance to oil. Therefore, at this time, only the rotational force of the steam turbine 25 is transmitted to the output shaft 122 of the hydraulic motor 120, and the power generator 21 performs power generation by the rotation of the steam turbine rotor 26.

When the steam turbine rotor 26 rotates, in consideration of a case in which the wind speed detected by the anemometer is out of a predetermined range, a bypass hydraulic line that directly connects the annular high-pressure tube 128h and the annular low-pressure tube 128l may be provided, and a bypass valve may be provided in the bypass hydraulic line. When the steam turbine rotor 26 rotates, in a case in which the wind speed detected by the anemometer is out of the predetermined range, the controller 101 sets the bypass valve to the open state. As a result, the oil flowing through the annular high-pressure tube 128h flows into the annular low-pressure tube 128l via the bypass hydraulic line, without passing through all the high-pressure valves 127h and the low-pressure valves 127l of the hydraulic motor 120.

As described above, in the present embodiment, power generation can be performed in the following seven modes of a to g.

a. Power generation only by the wind turbine 1
   b. Power generation by the wind turbine 1 and the gas turbine 10
   c. Power generation by the wind turbine 1 and the steam turbine 25
   d. Power generation by the wind turbine 1, the gas turbine 10, and the steam turbine 25
   e. Power generation only by the gas turbine 10
   f. Power generation by the gas turbine 10 and the steam turbine 25
   g. Power generation only by the steam turbine 25

Therefore, in the present embodiment, the responsiveness to a request for the amount of power generation from the outside can be enhanced as compared to the first embodiment.

Also in the present embodiment, since a plurality of array apparatuses constituting the solar thermal power generation equipment are disposed side by side in a vertical direction in a region surrounded by a plurality of columns 66 constituting the tower 65, as in the first embodiment, the installation region of the equipment can be effectively used.

In the present embodiment, the wind turbine 1, the gas turbine 10, and the steam turbine 25 share the single power generator 21. For this reason, in the present embodiment, equipment costs can be reduced as compared to a case in which a power generator that performs power generation by rotation of the wind turbine 1, a power generator that performs power generation by driving of the gas turbine 10, and a power generator that performs power generation by driving of the steam turbine 25 are provided separately.

In the present embodiment, a plurality of apparatuses constituting the solar thermal power generation equipment are suspended from the wire support machine 71 by the suspension wires 70. For this reason, also in this embodiment, when checking or repairing these apparatuses, by gradually reducing the winding amount of the suspension wire 70 wound around the winding drum 72a, lowering each apparatus, and sequentially detaching the apparatuses, each apparatus can be inspected or repaired relatively easily.

Third Embodiment

A third embodiment of the solar thermal power generation equipment will be described with reference to FIGS. 5 and 6.

Figure 5:
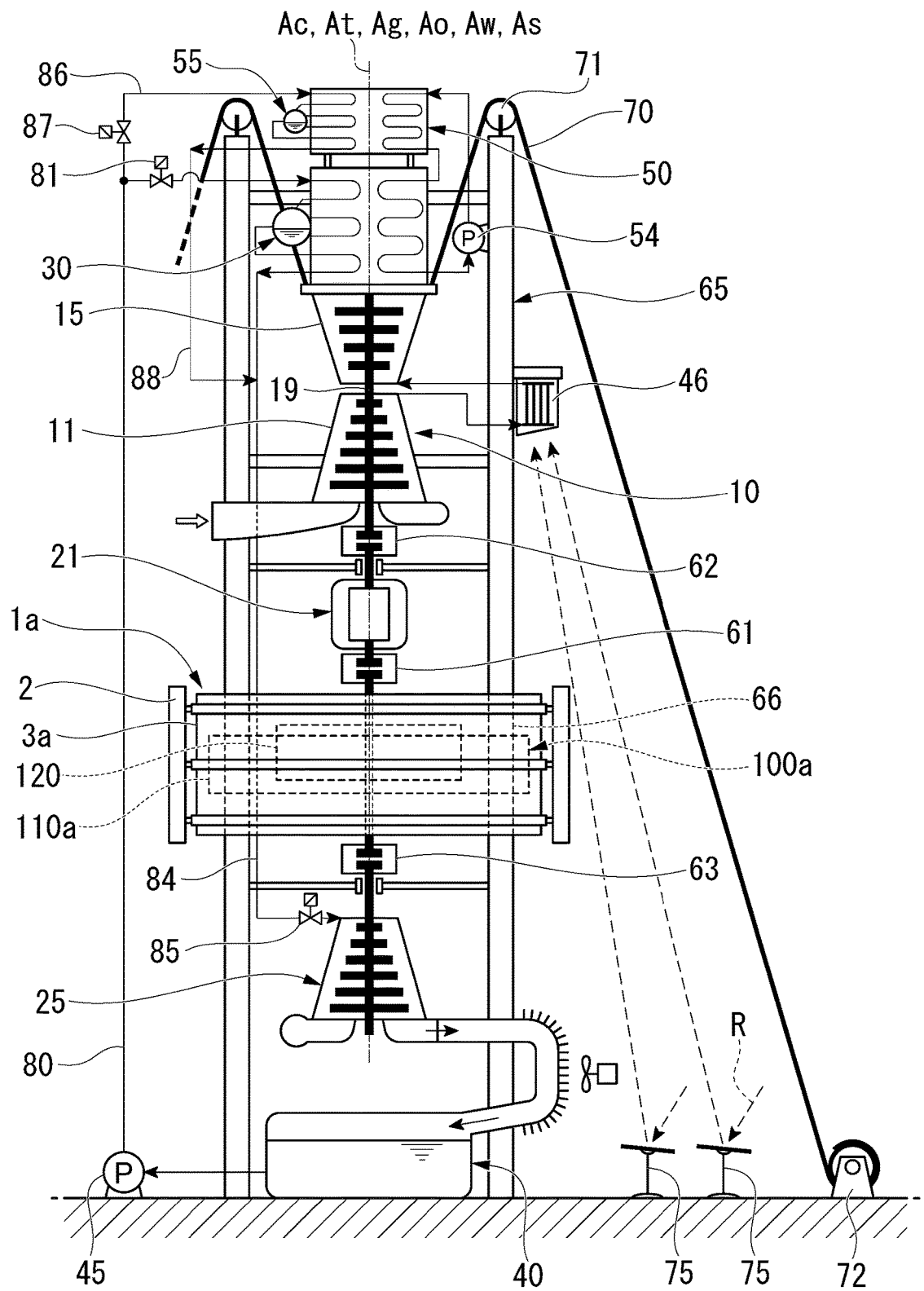
FIG. 5 is an explanatory view showing a configuration of solar thermal power generation equipment in a third embodiment according to the present invention.

As shown in FIG. 5, the solar thermal power generation equipment of this embodiment is equipped with a wind turbine 1a, a transmission mechanism 100a, a heat storage device 50, a medium circulation pump 54, a steam generator 55, an exhaust heat recovery boiler 30, a turbine 15, a compressor 11, a second clutch 62, a power generator 21, a first clutch 61, a third clutch 63, a steam turbine 25, a condenser 40, a water supply pump 45, a heat receiver 46, and a plurality of heliostats 75, similarly to the solar thermal power generation equipment of the second embodiment. However, the arrangement of the wind turbine 1a and the transmission mechanism 100a of the present embodiment is different from that of the wind turbine 1 and the transmission mechanism 100 of the second embodiment.

In the present embodiment, a position of the wind turbine 1a, a position of the hydraulic pump 110a of the transmission mechanism 100a, and a position of the hydraulic motor 120 of the transmission mechanism 100a overlap in the vertical direction. The wind turbine 1a, the hydraulic pump 110a, and the hydraulic motor 120 are disposed between the first clutch 61 and the third clutch 63 in the vertical direction.

Figure 6:
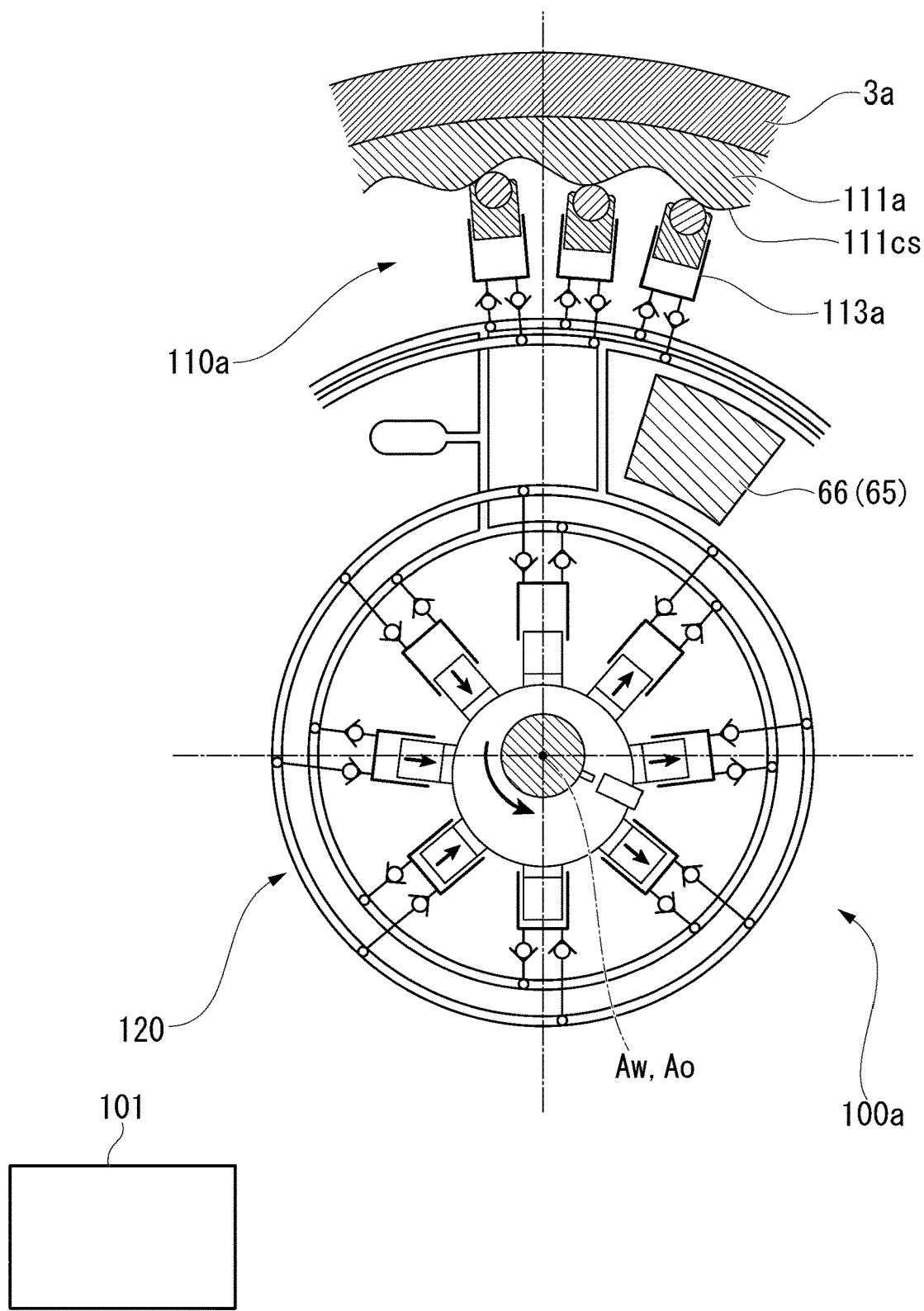
FIG. 6 is an explanatory view showing a configuration of a transmission mechanism in the third embodiment according to the present invention.

In the present embodiment, since the position of the wind turbine 1a, the position of the hydraulic pump 110a of the transmission mechanism 100a, and the position of the hydraulic motor 120 of the transmission mechanism 100a overlap in the vertical direction, as shown in FIG. 6, a hydraulic pump 110a is disposed on an inner peripheral side of the cylindrical wind turbine shaft 3a, and a hydraulic motor 120 is disposed further on an inner peripheral side than the hydraulic pump 110a. As shown in FIG. 5, the blade 2 is fixed to the outer peripheral side of the wind turbine shaft 3a. Although not shown, the axial movement of the wind turbine shaft 3a is restricted by a thrust bearing.

Figure 3:
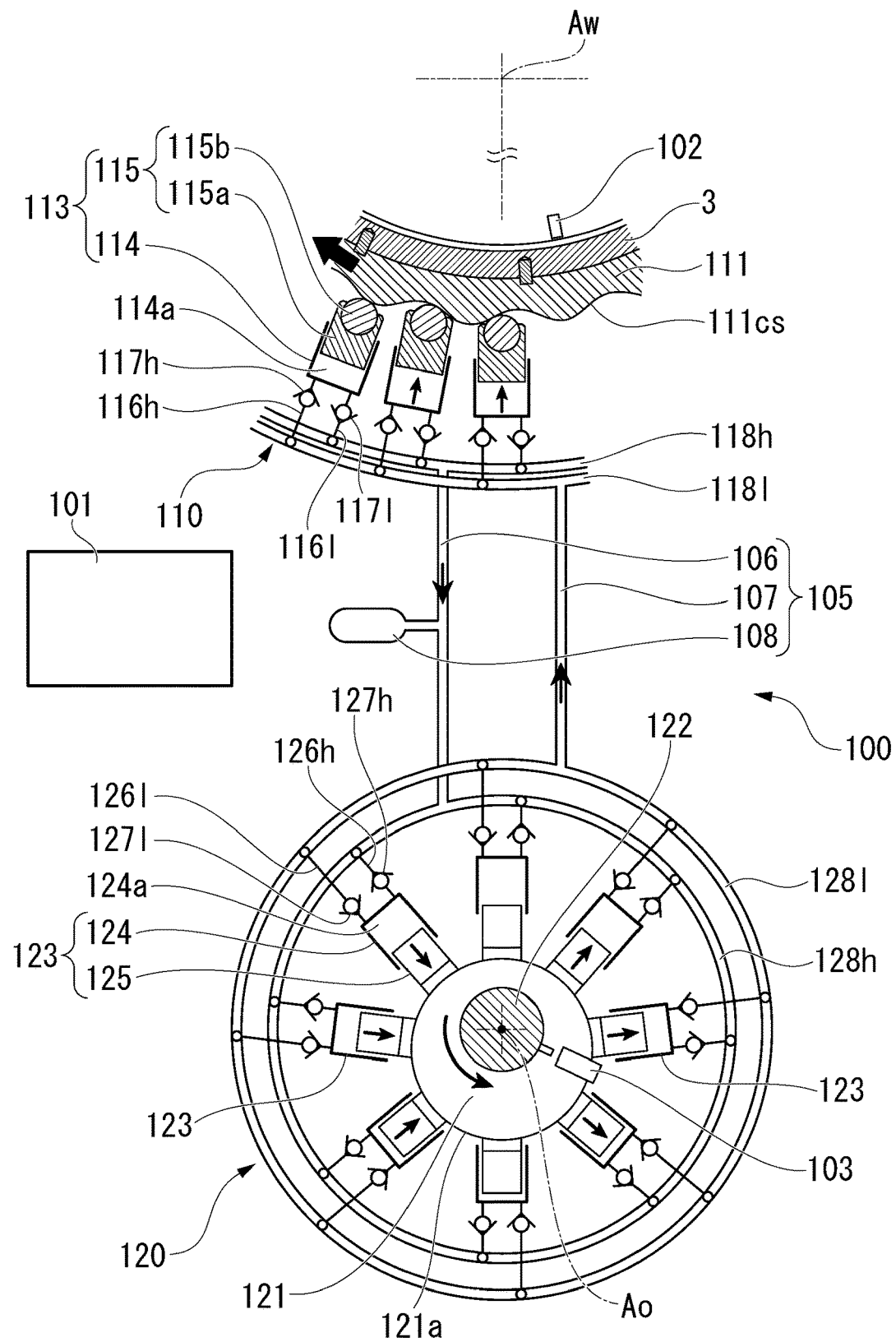
FIG. 3 is an explanatory view showing a configuration of a transmission mechanism in the first embodiment according to the present invention.

In the first embodiment and the second embodiment, as described using FIG. 3, the corrugated cylindrical cam 111 of the hydraulic pump 110 is fixed to the outer peripheral surface of the cylindrical wind turbine shaft 3a, and a plurality of reciprocating actuators 113 are annularly disposed on the outer peripheral side of the corrugated cylindrical cam 111. In the present embodiment, a corrugated cylindrical cam 111a of the hydraulic pump 110a is fixed to the inner peripheral surface of the cylindrical wind turbine shaft 3a. The inner peripheral surface of the corrugated cylindrical cam 111a forms a corrugated cam surface 111cs. A plurality of reciprocating actuators 113a of the hydraulic pump 110a are annularly disposed on the inner peripheral side of the corrugated cylindrical cam 111a. The hydraulic motor 120 is disposed on the inner peripheral side of the plurality of reciprocating actuators 113a disposed annularly.

In the present embodiment, the cylindrical wind turbine shaft 3a and the corrugated cylindrical cam 111a of the hydraulic pump 110a are disposed on the outer peripheral side of the region surrounded by the plurality of columns 66 constituting the tower 65. Therefore, the wind turbine 1a of the present embodiment rotates on the outer peripheral side of the region surrounded by the plurality of columns 66 constituting the tower 65. On the other hand, the hydraulic motor 120 is disposed in the region surrounded by a plurality of columns 66 constituting the tower 65.

As in the second embodiment, the first clutch 61 is connected to the first end of the output shaft 122 of the hydraulic motor 120 of the present embodiment, and the third clutch 63 is connected to the second end of the output shaft 122.

As described above, since the solar thermal power generation equipment of the present embodiment is equipped with the same apparatuses as those of the second embodiment, the same effects as those of the second embodiment can be obtained.

Furthermore, in this embodiment, since a position of the wind turbine 1a, a position of the hydraulic pump 110a of the transmission mechanism 100a, and a position of the hydraulic motor 120 of the transmission mechanism 100a overlap in the vertical direction, the equipment height and the tower height can be lowered. For this reason, equipment costs can be reduced.

Although this embodiment is a modified example of the second embodiment, also in the first embodiment, the position of the wind turbine 1, the position of the hydraulic pump 110, and the position of the hydraulic motor 120 may overlap in the vertical direction, as in the present embodiment.

Fourth Embodiment

Figure 7:
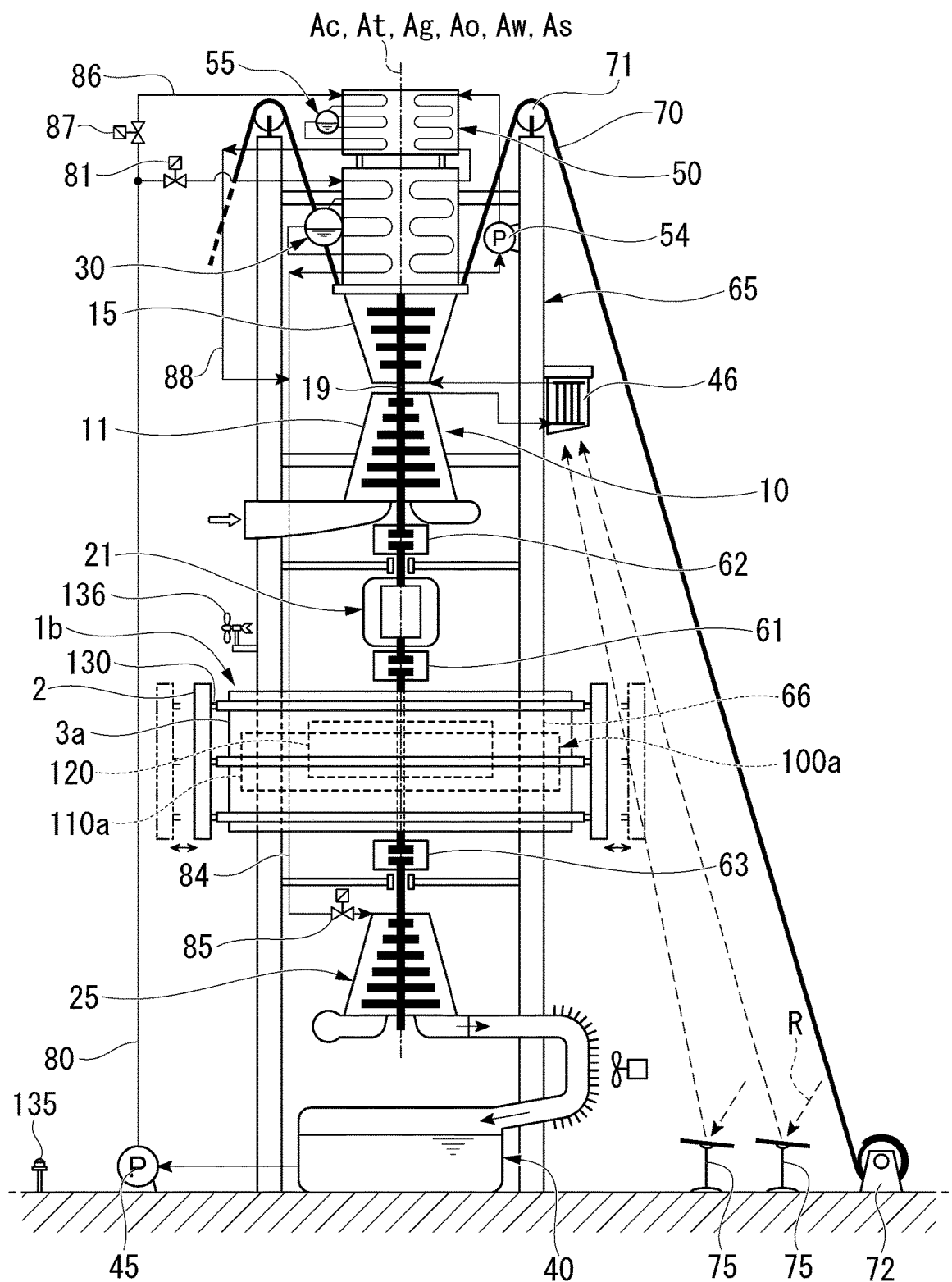
FIG. 7 is an explanatory view showing a configuration of solar thermal power generation equipment in a fourth embodiment according to the present invention.
Figure 8:
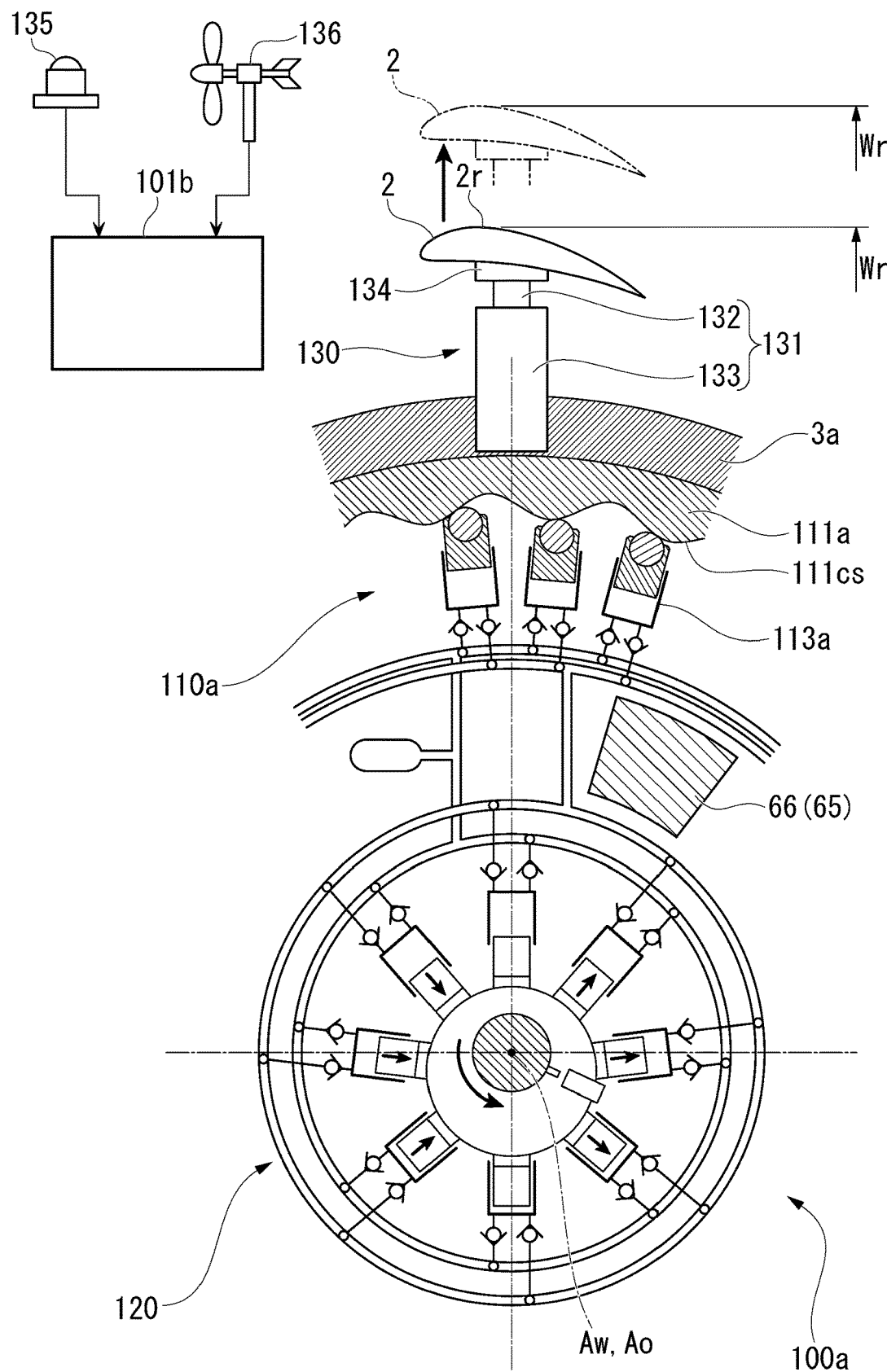
FIG. 8 is an explanatory view showing a configuration of a transmission mechanism, a wind turbine, and a wind turbine deformation changing mechanism in the fourth embodiment according to the present invention.

A fourth embodiment of the solar thermal power generation equipment will be described with reference to FIGS. 7 and 8.

The solar thermal power generation equipment of the present embodiment is a modified example of the solar thermal power generation equipment of the third embodiment. As shown in FIG. 7, the solar thermal power generation equipment of this embodiment is also equipped with a wind turbine 1b, a transmission mechanism 100a, a heat storage device 50, a medium circulation pump 54, a steam generator 55, an exhaust heat recovery boiler 30, a turbine 15, a compressor 11, a second clutch 62, a power generator 21, a first clutch 61, a third clutch 63, a steam turbine 25, a condenser 40, a water supply pump 45, a heat receiver 46, a plurality of heliostats 75, and a controller 101b (see FIG. 8), similarly to the solar thermal power generation equipment of the third embodiment. However, in the present embodiment, the configurations of the wind turbine 1b and the controller 101b are different from those of the wind turbine 1a and the controller 101 of the third embodiment. Further, the solar thermal power generation equipment of the present embodiment is equipped with a sunshine indicator 135 and an anemometer 136.

The wind turbine 1b of this embodiment also has a plurality of blades 2, and a cylindrical wind turbine shaft 3a that rotates about a wind turbine axis Aw extending in the vertical direction, similarly to the wind turbine 1a of the third embodiment. Furthermore, the wind turbine 1b of the present embodiment has a wind turbine radius changing mechanism 130. As shown in FIG. 8, the wind turbine radius changing mechanism 130 changes a wind turbine radius Wr, which is a distance from the wind turbine axis Aw to a farthest position 2r of the blade 2. The wind turbine radius changing mechanism 130 has a hydraulic cylinder 131 provided for each of the plurality of blades 2, and a blade connection plate 134. The hydraulic cylinder 131 has an operation rod 132 and a cylinder casing 133. The cylinder casing 133 accommodates a first end of the operation rod 132 such that the operation rod 132 is movable. The cylinder casing 133 is fixed to the wind turbine shaft 3a such that the movement direction of the operation rod 132 is directed in a radial direction with respect to the wind turbine axis Aw. The blade connection plate 134 is fixed to a second end on a side opposite to the first end of the operation rod 132. The blade 2 is fixed to the blade connection plate 134.

The controller (the control device) 101b controls the hydraulic pump 110a and the hydraulic motor 120 in the transmission mechanism 100a, similarly to the controller 101 of the third embodiment. Further, the controller 101b of the present embodiment controls the wind turbine radius changing mechanism 130. The controller 101b instructs the wind turbine radius changing mechanism 130 to change the wind turbine radius Wr, depending on the amount of solar radiation at the installation position of the tower 65 detected by the sunshine indicator 135, and the wind speed at the installation position of the wind turbine 1b provided at the tower 65 detected by the anemometer 136.

When the wind turbine 1b is disposed below the heat receiver 46 as in the present embodiment, in some cases, some of the sunlight R directed from the plurality of heliostats 75 toward the heat receiver 46 may be blocked by the blades 2, and the heat may not reach the heat receiver 46. Further, when the sunlight R does not reach the heliostat 75, the amount of power generation due to the sunlight R becomes zero. As a case in which the sunlight R does not reach the heliostat 75, there is a case in which the sun is covered with clouds in the daytime other than at night.

The controller 101b changes the wind turbine radius Wr in consideration of such a case. Specifically, the controller 101b calculates a current amount of power generation due to driving of the turbine 15 by the sunlight R and a current amount of power generation due to rotation of the wind turbine 1b by the wind. Further, the controller 101b compares a magnitude relationship between both the amount of power generations, and when the amount of power generation due to the wind is greater than the amount of power generation due to the sunlight R, the controller 101b increases the wind turbine radius Wr, and when the amount of power generation due to the sunlight R is greater than the amount of power generation due to the wind, the controller 101*b* decreases the wind turbine radius Wr.

The controller 101*b* obtains the amount of power generation due to the sunlight R, for example, by substituting the amount of solar radiation into the function F. The amount of solar radiation to be substituted into the function F is a value obtained by subtracting the amount of solar radiation of the sunlight R blocked by the blade 2 among the sunlight R directed from the plurality of heliostats 75 toward the heat receiver 46, from a value calculated by multiplying the amount of solar radiation detected by the sunshine indicator 135 by light-receiving areas and the like of the plurality of heliostats 75. The controller 101*b* obtains the amount of solar radiation of the sunlight R blocked by the blade 2 by, for example, substituting the current position data of the blade 2 and the current time into the function G. Further, the current position data of the blade 2 and the current time are grasped by the controller 101*b* that controls the wind turbine radius changing mechanism 130. The function G is a function which specifies the current position of the sun from the installation position of the tower 65 and the current time, and obtains the amount of solar radiation of the sunlight R blocked by the blades 2, among the sunlight R directed from the sun at this position to the heat receiver via the plurality of heliostats 75. In addition, the controller 101*b* substitutes the current wind force detected by the anemometer 136 into the function H to obtain the amount of power generation obtained by the wind.

In the present embodiment, when the amount of power generation due to the wind is greater than the amount of power generation due to the sunlight R, since the wind turbine radius Wr increases, the torque for rotating the wind turbine 1*b* increases, and the amount of power generation obtained by the wind can be increased. Further, in the present embodiment, when the amount of power generation due to the sunlight R is greater than the amount of power generation due to the wind, since the wind turbine radius Wr decreases, the amount of solar radiation of the sunlight R blocked by the blades 2 decreases, and the amount of power generation due to the sunlight R can be increased. Therefore, in the solar thermal power generation equipment of the present embodiment, the amount of power generation can be set to be higher than in the solar thermal power generation equipment of the third embodiment.

The wind turbine radius changing mechanism 130 of the present embodiment is a mechanism that moves the blades 2 in the radial direction with respect to the wind turbine axis Aw by hydraulic cylinders 131 provided for each of the plurality of blades 2. However, as described in Japanese Unexamined Patent Application First Publication No. 2006-037753, for example, the wind turbine radius changing mechanism 130 may be equipped with a movement member that can move in a direction in which the wind turbine axis Aw extends, one drive source which moves the movement member in the direction in which the wind turbine axis Aw extends, and a mechanism which mechanically connects the movement member and the blade 2 and moves the blade 2 in the radial direction with the movement of the movement member. Further, the wind turbine radius changing mechanism 130 may be a mechanism that changes the wind turbine radius Wr by changing the angle of the camber line of the blade 2 with respect to an imaginary line orthogonal to the wind turbine axis Aw. Such a mechanism can be realized, for example, by adopting a link mechanism.

This embodiment is a modified example of the third embodiment. However, the present invention is not limited to the solar thermal power generation equipment of the third embodiment, and as in the present embodiment, any solar thermal power generation equipment which a wind turbine is disposed below a heat receiver may be provided with the wind turbine radius changing mechanism 130, and the wind turbine radius Wr may be changed depending on the amount of solar radiation and the wind speed.

Further, in the present embodiment, although the wind turbine radius Wr is changed depending on the amount of solar radiation and the wind speed, the wind turbine radius Wr may be changed only by the amount of solar radiation. For example, when the amount of solar radiation detected by the sunshine indicator 135 is 0, such as night or a case in which the sun is blocked by clouds even in the daytime, the wind turbine radius Wr is maximized. In addition, a calendar for managing the time zone of the daytime from a sunrise time to a sunset time may be prepared without providing the sunshine indicator 135, the wind turbine radius Wr may be minimized at the time zone of the daytime indicated by the calendar, and the wind turbine radius Wr may be maximized at the time zone of the night time indicated by the calendar. Further, when the sunshine indicator 135 is provided, it may be provided on the tower 65 or may be provided on the heliostat 75.

Modified Example

The arrangement order of the plurality of array apparatuses of the second embodiment is different from the arrangement order of the plurality of array apparatuses of the third embodiment, which is a modified example of the second embodiment. That is, the arrangement order of the plurality of array apparatuses is not limited to the arrangement order exemplified in the aforementioned respective embodiments.

However, when the solar thermal power generation equipment is equipped with the exhaust heat recovery boiler 30, the steam turbine 25, and the condenser 40 as in the second embodiment, the third embodiment, and the fourth embodiment, they are preferably disposed arranged as follows.

It is preferable that the water storage unit 44 of the condenser 40 be disposed at the lowest part among the plurality of array apparatuses. This is because, among the plurality of apparatuses constituting the solar thermal power generation equipment, the water storage unit 44 of the condenser 40 becomes the heaviest at the time of operation.

As described above, since it is preferable to dispose the water storage unit 44 of the condenser 40 at the lowest part, basically, it is preferable to dispose the steam turbine 25 that discharges steam to the condenser 40 on a side closer to the condenser 40 than the gas turbine 10, that is, below the gas turbine 10.

The exhaust heat recovery boiler 30 that generates steam with the exhaust air from the gas turbine 10 is lighter than the compressor 11 and the turbine 15 that constitute the gas turbine 10. For this reason, it is preferable to dispose the exhaust heat recovery boiler 30 above the compressor 11 and the turbine 15 that constitute the gas turbine 10. Further, in the gas turbine 10, the turbine 15 sends the exhaust air to the exhaust heat recovery boiler 30. Exhaust air (exhaust medium) exhausted from the turbine 15 rises by natural convection because of a high temperature. Therefore, it is preferable to dispose the turbine 15 above the compressor 11 and dispose the exhaust heat recovery boiler 30 on the turbine 15.

The tower 65 of the aforementioned embodiment is formed of a steel material. However, the tower 65 may be configured to have, for example, a first structure formed of concrete, and a second structure formed of a steel plate or the like that surrounds an outer periphery of the first structure. In this case, the second structure such as a steel plate functions as a concrete frame which forms the first structure. Concrete has high heat storage properties. For this reason, the concrete which forms part of the tower 65 may be used as a heat storage body. In this case, part of the piping through which the heat transfer medium flows may be disposed inside the boiler casing 31, another part of the piping may communicate with the inside of the concrete, and the heat of the exhaust air may be stored in the concrete. Further, the piping through which the steam flows may communicate with the inside of the concrete, and the heat of the steam may be stored in the concrete. Further, part of piping through which the feedwater flows may communicate with the inside of the concrete, and the feedwater may be heated by the heat stored in the concrete to convert the water into steam.

The wind turbine includes a horizontal shaft-type wind turbine in addition to a vertical shaft-type wind turbine of each of the aforementioned embodiments. In the present invention, the horizontal shaft-type wind turbine may be adopted instead of the vertical shaft-type wind turbine of the present embodiment. However, in the case of the horizontal shaft-type wind turbine, since there is a need to make the direction in which the wind flows substantially coincide with the direction in which the wind turbine shaft extends, the structure becomes complicated and the cost of the wind turbine increases. Further, a load from the wind is applied in the direction in which the wind turbine shaft extends, and as a result, a lateral load is applied to the upper part of the tower 65. For this reason, it is necessary to configure the tower 65 that is strong against bending moment, and the cost of the tower 65 increases. In particular, when a plurality of array apparatuses are arranged in the vertical direction as in the present invention, since the height of the tower 65 is increases, the bending moment to be applied to the tower 65 increases. On the other hand, in the case of the vertical shaft-type wind turbine, since there is no need to make the direction in which the wind flows coincide with the direction in which the wind turbine shaft 3 extends, the structure is simpler than in the horizontal shaft-type wind turbine, and the cost of the wind turbine 1 can be reduced. Further, in the vertical shaft-type wind turbine, even if the blades 2 receive wind, the horizontal force to be applied to the vertically extending wind turbine shaft 3 can be set to be smaller than the horizontal force to be applied to the wind turbine shaft of the horizontal shaft-type wind turbine. Therefore, in the vertical shaft-type wind turbine, the lateral load to be applied to the upper part of the tower 65 can be set to be smaller than that in the horizontal shaft-type wind turbine, and the cost of the tower 65 can be reduced.

Therefore, in the present invention, it is preferable to adopt a vertical shaft-type wind turbine rather than a horizontal shaft-type wind turbine as the wind turbine. In addition, as the vertical shaft-type wind turbine, there are a Darrieus-type wind turbine, a Savonius-type wind turbine, a cross flow-type wind turbine, and the like, in addition to the gyromill-type wind turbine in the aforementioned embodiment. In the present invention, any of these vertical shaft-type wind turbines may be adopted.

The transmission mechanisms 100 and 100a of the aforementioned embodiments each include a hydraulic line. However, the transmission mechanism may include only mechanical elements such as gears. In this case, the transmission mechanism preferably includes a continuously variable transmission to cope with a change in the rotation of the wind turbine 1.

In the aforementioned embodiments, the wind turbine axis Aw, the turbine axis At, the steam turbine axis As, and the power generator axis Ag are located on the same straight line. However, for example, when a clutch or a transmission is provided between the gas turbine rotor 19 and the power generator rotor 22, or when the clutch or the transmission is provided between the steam turbine 25 and the power generator rotor 22, although the respective axes are parallel to each other, they may not be located on the same straight line. Therefore, as long as the respective axes extend in the vertical direction and are parallel to each other, they may not be located on the same straight line.

In the aforementioned embodiments, the gas turbine 10 and the like are suspended and supported from the tower 65, using the suspension wire 70. However, since the suspension wire 70 is mainly used in consideration of inspection or repair, as long as the gas turbine 10 or the like can be supported by the tower 65, the gas turbine 10 or the like may be supported by another method. For example, a bracket may be fixed to the tower 65, and the gas turbine 10 may be attached to the bracket.

INDUSTRIAL APPLICABILITY

According to an aspect of the present invention, since the occupied areas of the plurality of array apparatuses overlap in the vertical direction, the total occupied areas of the plurality of array apparatuses can be reduced. Therefore, according to an aspect of the present invention, it is possible to effectively use the installation region of the equipment.

REFERENCE SIGNS LIST 1, 1a, 1b Wind turbine
2 Blade
3, 3a Wind turbine shaft
4 Blade support arm
10 Gas turbine
11 Compressor
12 Compressor rotor
13 Compressor casing
14 Intake casing
15 Turbine
16 Turbine rotor
17 Turbine casing
19 Gas turbine rotor
21 Power generator
22 Power generator rotor
23 Power generator casing
25 Steam turbine
26 Steam turbine rotor
27 Steam turbine casing
28 Exhaust casing
30 Exhaust heat recovery boiler
31 Boiler casing
32 Economizer
33 Evaporator
34 Superheater
39 Leg
40 Condenser
41 Heat radiating unit
42 Finned heat transfer tube
43 Fan
44 Water storage unit
45 Water supply pump
46 Heat receiver
47 Heat transfer tube 48 Heat receiver casing
49 Bracket
50 Heat storage device
51 Heat storage body
52 Medium heat transfer tube
52a Heat storage body heat exchange unit
52b Exhaust air heat exchange unit
53 Heat storage casing
54 Medium circulation pump
55 Steam generator
56 Heat storage body heat transfer tube
57 Steam drum
61 First clutch
62 Second clutch
63 Third clutch
64 Radial bearing
65 Tower
66 Column
67 Beam
70 Suspension wire
70a First end
70b Second end
71 Wire support machine
71a Support roller
71b Roller support machine
72 Winding machine
72a Winding drum
72b Drum support machine
75 Heliostat
76 Reflecting mirror
77 Support leg
78 Mirror driver
80 Water supply line
81 Water supply control valve
82 Compressed air line
83 Heated air line
84 Main steam line
85 Main steam control valve
86 Auxiliary water supply line
87 Auxiliary water supply control valve
88 Auxiliary steam line
100, 100a Transmission mechanism
101, 101b Controller (control device)
102 Rotary angle sensor
103 Rotational speed sensor
105 Connecting hydraulic line
106 Connecting high-pressure tube
107 Connected low-pressure tube
108 Accumulator
110, 110a Hydraulic pump
111, 111a Corrugated cylindrical cam
111cs Cam surface
113, 113a Reciprocating actuator
114 Cylinder
114a Hydraulic chamber
115 Piston
115a Piston body
115b Roller
116h Branch high-pressure tube
116l Branch low-pressure tube
117h High-pressure valve
117l Low-pressure valve
118h Annular high-pressure tube
118l Annular low-pressure tube
120 Hydraulic motor
121 Eccentric cam
121a Cam surface
122 Output shaft
123 Reciprocating actuator
124 Cylinder
124a Hydraulic chamber
125 Piston
126h Branch high-pressure tube
126l Branch low-pressure tube
127h High-pressure valve
127l Low-pressure valve
128h Annular high-pressure tube
128l Annular low-pressure tube
130 Wind turbine radius changing mechanism
131 Hydraulic cylinder
132 Operation rod
133 Cylinder casing
134 Blade connection plate
135 Sunshine indicator
136 Anemometer
R Sunlight
Ac Compressor axis
At Turbine axis
Ag Power generator axis
Ao Central axis
As Steam turbine axis
Aw Wind turbine axis
Wr Wind turbine radius

The invention claimed is:

1. Solar thermal power generation equipment comprising:
a wind turbine which is configured to rotate by receiving wind;
a compressor which is configured to compress a working medium to generate a compressed medium;
a heat receiver which is configured to heat the compressed medium by receiving sunlight;
a turbine which is configured to be driven by the compressed medium heated with the heat receiver;
a power generator which is configured to perform power generation by driving of the turbine;
a transmission mechanism which transmits the rotation of the wind turbine to the power generator; and
a tower which supports the wind turbine, the compressor, the heat receiver, the turbine and the power generator,
wherein the compressor has a compressor rotor which is configured to rotate about a compressor axis extending in a vertical direction, and a compressor casing which covers the compressor rotor,
the turbine has a turbine rotor which is configured to rotate about a turbine axis extending in the vertical direction, and a turbine casing which covers the turbine rotor,
the compressor rotor and the turbine rotor are mechanically connected to form a gas turbine rotor,
the power generator has a power generator rotor which is mechanically connected to the gas turbine rotor, and is configured to rotate about a power generator axis extending in the vertical direction, and a power generator casing which covers the power generator rotor,
the wind turbine, the compressor, the turbine and the power generator each constitute an array apparatus,
the plurality of array apparatuses are arranged in the vertical direction,
the wind turbine has a wind turbine shaft which is configured to rotate about a wind turbine axis extending in the vertical direction, and a blade which is fixed to the wind turbine shaft and is configured to receive the wind to rotate the wind turbine shaft about the wind turbine axis, and the wind turbine is disposed at a position lower than the heat receiver, and the wind turbine has a wind turbine radius changing mechanism which is configured to change a wind turbine radius which is a distance from the wind turbine axis to a farthest position in the blade.

2. The solar thermal power generation equipment according to claim 1, further comprising:
a control device which instructs the wind turbine radius changing mechanism to change the wind turbine radius, depending on an amount of solar radiation at an installation position of the tower.

3. The solar thermal power generation equipment according to claim 2, wherein the control device instructs the wind turbine radius changing mechanism to change the wind turbine radius, depending on the amount of solar radiation at the installation position of the tower and a wind speed at the installation position of the tower.

4. The solar thermal power generation equipment according to claim 1, further comprising:
a clutch between the gas turbine rotor and the power generator rotor, which is configured to switch a connection state between the gas turbine rotor and the power generator rotor, between a transmission state in which power is transmittable and a non-transmission state in which no power transmission is performed.

5. The solar thermal power generation equipment according to claim 1, wherein the transmission mechanism has
a hydraulic pump which is configured to convert the rotation of the wind turbine into oil pressure,
a hydraulic motor which has an output shaft, and is configured to receive the oil compressed by the hydraulic pump to rotate the output shaft, and
a connecting hydraulic line which connects the hydraulic pump and the hydraulic motor so that the oil passes between the hydraulic pump and the hydraulic motor,
the output shaft of the hydraulic motor being mechanically connected to the power generator rotor.

6. The solar thermal power generation equipment according to claim 5, wherein the transmission mechanism has a rotational speed adjusting mechanism which is configured to set a rotational speed of the output shaft to a target rotational speed.

7. The solar thermal power generation equipment according to claim 5, further comprising:
a clutch between the output shaft of the hydraulic motor and the power generator rotor, which is configured to switch a connection state between the output shaft and the power generator rotor, between a transmission state in which power is transmittable and a non-transmission state in which no power transmission is performed.

8. The solar thermal power generation equipment according to claim 1, further comprising:
an exhaust heat recovery boiler which is configured to heat water with an exhaust medium which is the working medium exhausted from the turbine and is configured to turn the water into steam.

9. The solar thermal power generation equipment according to claim 8, wherein the exhaust heat recovery boiler forms an array apparatus, and
the plurality of array apparatuses including the exhaust heat recovery boiler are arranged in the vertical direction.

10. The solar thermal power generation equipment according to claim 8, further comprising:
a steam turbine which is configured to be driven by steam from the exhaust heat recovery boiler;
a condenser which is configured to return steam, which is exhausted from the steam turbine, into water; and
a water supply line which is configured to guide water in the condenser to the exhaust heat recovery boiler.

11. The solar thermal power generation equipment according to claim 10, wherein the steam turbine has a steam turbine rotor which is configured to rotate about a steam turbine axis extending in the vertical direction, and a steam turbine casing which covers the steam turbine rotor,
the steam turbine forms an array apparatus, and
the plurality of array apparatuses including the steam turbine are arranged in the vertical direction.

12. The solar thermal power generation equipment according to claim 11, wherein the compressor and the steam turbine are disposed on one side of an upper side in the vertical direction and a lower side in the vertical direction, on the basis of the power generator,
the steam turbine is disposed on the other side of the upper side in the vertical direction and the lower side in the vertical direction, on the basis of the power generator,
the steam turbine rotor is mechanically connected to the power generator rotor, and
a clutch is included between the steam turbine rotor and the power generator rotor, which is configured to switch a connection state between the steam turbine rotor and the power generator rotor, between a transmission state in which power is transmittable and a non-transmission state in which no power transmission is performed.

13. The solar thermal power generation equipment according to claim 10, wherein the condenser has a water storage unit in which the water is stored after the steam exhausted from the steam turbine returns to the water,
the water storage unit forms an array apparatus, and
the plurality of array apparatuses including the water storage unit are arranged in the vertical direction.

14. The solar thermal power generation equipment according to claim 8, wherein the turbine is disposed above the compressor, and
the exhaust heat recovery boiler is disposed above the turbine.

15. The solar thermal power generation equipment according to claim 8, further comprising:
a heat storage body which stores heat of the exhaust medium.

16. The solar thermal power generation equipment according to claim 10, further comprising:
a heat storage body which stores heat of the exhaust medium;
an auxiliary water supply line branching from the water supply line;
a steam generator which has a heat transfer tube connected to the auxiliary water supply line and coming into contact with the heat storage body to exchange heat between the water from the auxiliary water supply line and the heat storage body, and is configured to heat the water with the heat storage body to turn water into steam; and
an auxiliary steam line which is configured to guide steam generated by the steam generator to the steam turbine.

17. The solar thermal power generation equipment according to claim 1, further comprising:
a heliostat which has a reflecting mirror which reflects sunlight, and a mirror driver which is configured to change a direction of the reflecting mirror so that sunlight reflected by the reflecting mirror is directed to the heat receiver.

\* \* \* \* \*